US010643021B2

(12) United States Patent
Xue et al.

(10) Patent No.: US 10,643,021 B2
(45) Date of Patent: *May 5, 2020

(54) METHOD AND DEVICE FOR PROCESSING WEB PAGE CONTENT

(71) Applicant: Tencent Technology (Shenzhen) Company Limited, Shenzhen (CN)

(72) Inventors: Jun Xue, Shenzhen (CN); Li Wan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 66 days.

This patent is subject to a terminal disclaimer.

(21) Appl. No.: 16/007,695

(22) Filed: Jun. 13, 2018

(65) Prior Publication Data
US 2018/0293210 A1    Oct. 11, 2018

Related U.S. Application Data

(63) Continuation of application No. 14/615,327, filed on Feb. 5, 2015, now Pat. No. 10,019,414, which is a
(Continued)

(30) Foreign Application Priority Data

Jun. 18, 2013 (CN) .......................... 2013 1 0242944

(51) Int. Cl.
*G06F 3/00* (2006.01)
*G06F 40/106* (2020.01)
(Continued)

(52) U.S. Cl.
CPC ........ *G06F 40/106* (2020.01); *G06F 3/04817* (2013.01); *G06F 16/957* (2019.01); *G06F 40/14* (2020.01)

(58) Field of Classification Search
CPC . G06F 16/957; G06F 3/04817; G06F 17/2247
See application file for complete search history.

(56) References Cited

U.S. PATENT DOCUMENTS 7,051,277 B2    5/2006 Kephart et al.
2008/0034325 A1    2/2008 Ording
(Continued)

FOREIGN PATENT DOCUMENTS

CN    102411587 A    4/2012
CN    102591971 A    7/2012
(Continued)

OTHER PUBLICATIONS

Tencent Technology, ISRWO, PCT/CN2014/072297, Jun. 9, 2014, 8 pgs.
(Continued)

*Primary Examiner* — Kyle R Stork
(74) *Attorney, Agent, or Firm* — Morgan, Lewis & Bockius LLP

(57) ABSTRACT

An electronic device displays a web page in a web browser, analyzes source code of the web page and identifies multimedia items in the web page according to their respective labels in the source code, each multimedia item having an associated multimedia type. After categorizing the multimedia items into a first plurality of multimedia items of a first multimedia type and a second plurality of multimedia items of a second multimedia type different from the first multimedia type, the electronic device replaces the web page with displaying a user interface for the multimedia items, including: a first region with a first icon corresponding to a first plurality of multimedia items of a first multimedia type; and a second region with a second icon corresponding to a second plurality of multimedia items of a second multimedia type.

18 Claims, 13 Drawing Sheets

Related U.S. Application Data continuation of application No. PCT/CN2014/072297, filed on Feb. 20, 2014.

(51) Int. Cl.
  *G06F 16/957* (2019.01)
  *G06F 40/14* (2020.01)
  *G06F 3/0481* (2013.01)

(56) References Cited

U.S. PATENT DOCUMENTS

| | | |
|---|---|---|
| 2008/0307454 A1 | 12/2008 | Ahanger et al. |
| 2009/0144392 A1 | 6/2009 | Wang et al. |
| 2009/0144642 A1 | 6/2009 | Crystal |
| 2011/0191381 A1 | 8/2011 | Zhengt et al. |
| 2014/0189478 A1 | 7/2014 | Bazaz |

FOREIGN PATENT DOCUMENTS

| | | |
|---|---|---|
| CN | 102855313 A | 1/2013 |
| WO | WO 2004107212 A1 | 12/2004 |

OTHER PUBLICATIONS

Tencent Technology, IPRP, PCT/CN2014/072297, Dec. 22, 2015, 6 pgs.

600

650

METHOD AND DEVICE FOR PROCESSING WEB PAGE CONTENT

CROSS-REFERENCE TO RELATED APPLICATION

This application is a continuation application of U.S. patent application Ser. No. 14/615,327, entitled "METHOD AND DEVICE FOR PROCESSING WEB PAGE CONTENT" filed on Feb. 5, 2015, which a continuation application of PCT Patent Application No. PCT/CN2014/072297, entitled "METHOD AND DEVICE FOR PROCESSING WEB PAGE CONTENT" filed Feb. 20, 2014, which claims priority to Chinese Patent Application Serial No. 201310242944.5, entitled "METHOD, APPARATUS, AND BROWSER CLIENT END FOR PROCESSING WEB PAGE CONTENT", filed Jun. 18, 2013, all of which are incorporated herein by reference in their entirety.

FIELD OF THE INVENTION

The present application relates to the field of Internet technologies, and more particularly to a method and device for processing web page content.

BACKGROUND OF THE INVENTION

With the rapid development of the Internet, more and more users use various web browsers to view different kinds of web pages. In the prior art, generally, when displaying a web page, a web browser displays different types of content in different areas of the web page. Each area may include resources corresponding to a content block. The resources include content such as images, text, videos, or audio. The user is able to browse the resources corresponding to the content blocks in the web page using the web browser. When browsing an image in the web page with the web browser, the user is able to press or click the image, to call out an instruction operation menu, which includes instructions such as open, open in a new labeled web page, add into a browsing list, save image, and copy. When wishing to save the image, the user selects the save image instruction in the instruction operation menu. When browsing a video or other downloadable resource in the web page, the user is able click a corresponding downloading button in the web page to download and save the video or other downloadable resource.

While implementing the present application, the inventor finds that the prior art has at least the following problems: In the prior art, the web browser displays the resources and text corresponding to all the content blocks in the same web page. When the user intends to perform an operation on a resource in a certain content block of the web page (e.g., a saving or downloading operation), the user must (1) find the resource corresponding in the content block, and then (2) call out a corresponding instruction operation menu or click a corresponding downloading button for the content block so as to download or save the resource. This sequence of steps requires a high degree of complexity in order to perform operations on the resource in the web page.

SUMMARY

In order to address the problems in the prior art, the embodiments of the present application provide a method and device for processing web page content.

In some embodiments, a method is performed at an electronic device with one or more processors and memory (e.g., mobile device 500, FIGS. 5A-5E and 8). The method includes: displaying a web page in a web browser; analyzing source code of the web page and identifying multimedia items in the web page according to their respective labels in the source code, each multimedia item having an associated multimedia type; categorizing the multimedia items into a first plurality of multimedia items of a first multimedia type and a second plurality of multimedia items of a second multimedia type different from the first multimedia type; replacing the web page with displaying a first user interface for the multimedia items, the first user interface including: a first region with a first icon that includes respective visual representations of the first plurality of multimedia items; and a second region, distinct from the first region, with a second icon that includes respective visual representations of the second plurality of multimedia items of a second multimedia type, different from the first multimedia type; detecting a user input of selecting the first icon corresponding to the first plurality of multimedia items in the first region of the first user interface for the multimedia items; and replacing the first user interface for the multimedia items with displaying a second user interface for the first plurality of multimedia items of the first media type, the second user interface including: a third region with a third icon corresponding to a first media item in the first plurality of multimedia items of the first media type; and a fourth region, distinct from the third region, with a fourth icon corresponding to a second media item in the first plurality of multimedia items of the first media type.

In some embodiments, an electronic device (e.g., mobile device 500, FIGS. 5A-5E and 8) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device (e.g., mobile device 500, FIGS. 5A-5E and 8) with one or more processors, cause the electronic device to perform the operations of the methods described herein.

Various advantages of the present application are apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. Apparently, the accompanying drawings in the following description are only some embodiments of the present application, and persons of ordinary skill in the art can derive other drawings from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application more comprehensible, the implementation of the present application is described in further detail below with reference to the accompanying drawings.

Figure 1:
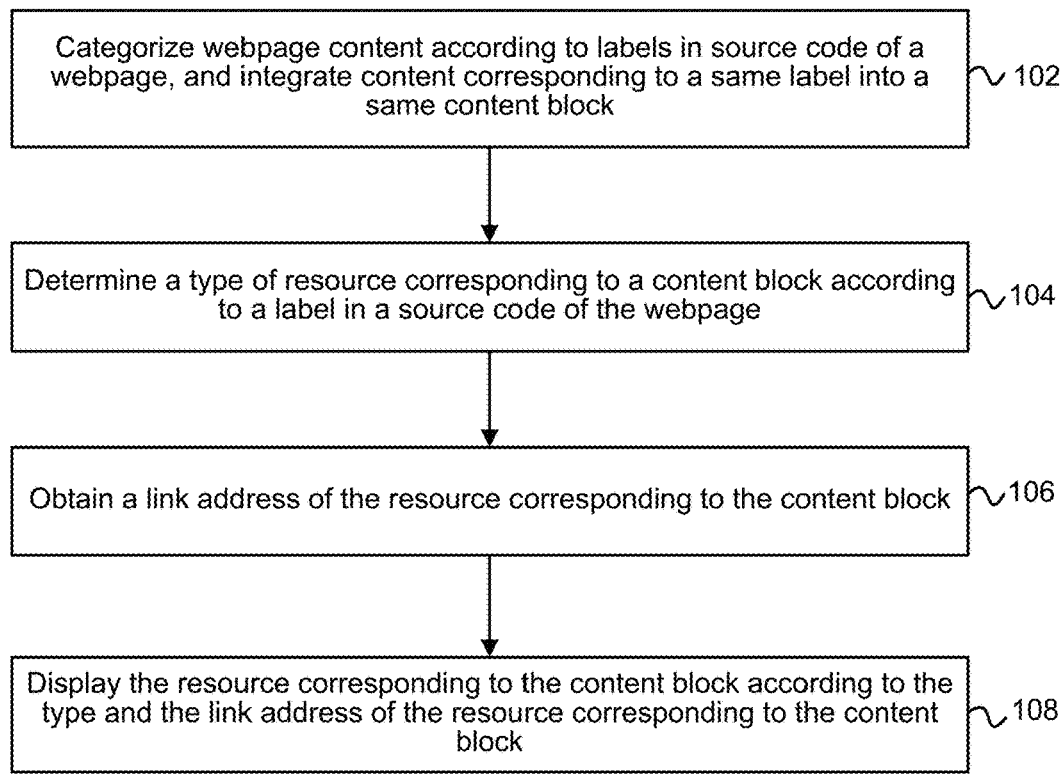
FIG. 1 is a flowchart diagram of a method of processing web page content in accordance with some embodiments.

FIG. 1 is a flowchart diagram of a method 100 of processing web page content in accordance with some embodiments. In some embodiments, the method is performed at an electronic device (e.g., mobile device 500, FIGS. 5A-5E and 8), including one or more processors and memory, or a component thereof (e.g., web page content processing module 600, FIGS. 6A-6B). In some embodiments, the electronic device includes a touch screen display for detecting user instructions and showing results on the same display.

The electronic device categorizes (102) web page content according to labels in the source code of the web page and integrates content corresponding to a same label into a same content block. For example, the content block includes the label, a link address of a resource corresponding to the label, other parameter information of the resource corresponding to the label, and the like. In this case, the source code of the web page is categorized according to the label, and the content corresponding to the same label is integrated into the same content block.

The electronic device determines (104) a type of resource (or multimedia item) corresponding to a content block according to a label in a source code of the web page.

The electronic device obtains (106) the link address of the resource corresponding to the content block.

The electronic device displays (108) the resource corresponding to the content block according to the type and the link address of the resource corresponding to the content block.

In some embodiments, steps 102-108 describe the technical solution of the present application by taking one label (each label corresponds to one content block and one resource) in the source code of the web page as an example. In practical application, the foregoing steps in the embodiment are utilized to categorize each label in the source code of the web page and integrate the content corresponding to a same label into a same content block. The number of labels in the source code of the web page is the same as the number of the content blocks and the number of the resources.

The label of the web page is specifically a label in a source code file of the web page such as a video label, or an image label, or a label of another downloadable resource. For example, a <video> label indicates that the following link is a video resource, and a <image> label indicates that the following link is an image resource. According to this solution, multimedia resources (or items) in the web page are identified.

Because there are labels in the source code file of the web page, according to step 102, the source code of the web page is categorized according to the labels in the source code of the web page, and the content corresponding to a same label is integrated into a same content block. The web page content is categorized into at least one content block according to at least one label in the web page, and each content block corresponds to the resource of the at least one label. For example, a web page includes resources corresponding to multiple video labels, and correspondingly, there are respective content blocks corresponding to the multiple video labels. In another example, a web page includes resources corresponding to multiple image labels and the like, and correspondingly, there are respective content blocks corresponding to the multiple image labels. Similarly, the type of the resources corresponding to the content block are determined according to the label of each content block, such as a video type, an image type, or another type of downloadable resource (e.g., a compressed file).

At the same time, according to step 106, with reference to the source code file of the web page, the link address of the resources corresponding to each content block are obtained. In this case, the resources corresponding to each content block are displayed according to the type of the resource and the link address of the corresponding resources. For example, for a content block of the video type, a video on a web page of the link address of the resource corresponding to the content block is displayed in a video displaying manner. As for a content block of the image type, an image on a web page of the link address of the resource corresponding to the content block is displayed in an image displaying manner. As for a content block of another downloadable resource type, the resource corresponding to the content block is displayed in a corresponding displaying manner.

It should be noted that a web page applicable to the technical solution of the present application is a web page including labels in the source code file. For example, the web page is preferably a hypertext markup language (HTML) web page.

According to the web page content processing method in the embodiment, the source code of the web page is categorized according to the labels in the source code of the web page, and the content corresponding to a same label is integrated into a same content block. A type of resource corresponding to a content block is determined according to a label in the source code of the web page and a link address of the resource corresponding to the content block is obtained. The resource corresponding to the content block is displayed according to the type and the link address of the resources corresponding to the content block. As such, the web page content is clearly displayed according to the content block, so as to conveniently operate the resource corresponding to each content block, which effectively lowers the complexity of operations on the resource corresponding to the content block in the web page.

In some embodiments, based on the technical solution shown in FIG. 1, step 106 optionally includes the following two situations.

In the first situation, the link address of the resource corresponding to the content block is directly obtained from the web page. In this case, in the source code file of the web page, behind the label of the content block, a real link address of the resources corresponding to the content block exists and a web page corresponding to the link address includes all the information of the resources corresponding to the content block. At this time, the electronic device directly obtains the link address of the resources corresponding to the content block from the web page.

In the second situation, step 106 includes the following steps:

106A: Obtain a false link address of the resources corresponding to the content block from the source code of the web page;

106B: Send the false link address to a daemon server; and

106C: Receive the link address of the resource corresponding to the content block sent by the daemon server, where the link address of the resource corresponding to the content block is obtained by the daemon server according to the false link address.

In this case, it can be understood that the real link address of the resource corresponding to the content block is hidden in the source code file of the web page. At this time, the link address of the resource corresponding to the content block is firstly obtained at a location behind the label in the content block and from the source code file of the web page. Because the electronic device determines that the link address cannot obtain the resources corresponding to the content block, the link address is called the false link address of the resources corresponding to the content block. Then, the false link address is sent to the daemon server. The daemon server adopts, according to the false link address, a path tracing manner to obtain the real link address of the resource corresponding to the content block such that the resource corresponding to the content block is obtained from the web page corresponding to the link address. For example, the solution is called an xPath (XML Path Language) solution. Eventually, the daemon server then feeds back the obtained link address of the resources corresponding to the content block to the web page content processing device.

Further, in some embodiments, based on the technical solution in the foregoing embodiment, before step 106A, the technical solution optionally further includes: When the resource corresponding to the content block cannot be obtained from the web page corresponding to the link address of the resource from the source code web page of the web page, determine the link address of the resource corresponding to the content block in the source code of the web page as the false link address.

Further, in some embodiments, based on the technical solution in the foregoing embodiment, after step 102, the technical solution optionally further includes:

103A: Set a function operating button of the resource corresponding to the content block; and 103B: Display a function operating button of the resource corresponding to the content block.

Preferably, the function operating button in the embodiment of the present application includes at least one of a downloading button, a transmitting button, or a sharing button. In practical application, with the development of technologies, other function operating buttons are included. For implementing of the function operating button, reference may be made to current relevant technologies.

When the function operating button of the resources corresponding to each content block is set, the setting needs to be performed according to basic information of the resource corresponding to the content block such as the link address. For example, when the downloading button is set, a link is established between the downloading button and the link address of the resource corresponding to the content block. In this example, when the downloading button is selected, the electronic device downloads the resource corresponding to the content block from a website corresponding to the link address of the resource corresponding to the content block. In another example, when the transmitting button or the sharing button is specifically set, a link to the daemon server is established. In this example, when the transmitting or sharing button is selected, the electronic device causes the resource corresponding to the content block to be transmitted to or shared with a target mobile device through the daemon server. For more information, reference may be made to relevant transmitting and sharing technical solutions, and details are not described herein again.

Further, in some embodiments, based on the technical solution in the foregoing embodiment, after step 103B, the technical solution optionally further includes: Receive a selecting instruction made by the user on the resource of the content block and determine a corresponding function operating button according to the selecting instruction. For example, receiving a selecting instruction made by the user includes receiving an instruction selected through a touch screen display or input through a man-machine interface input module by the user. In this example, the selecting instruction includes a specific selecting instruction on the resources corresponding to a certain content block, such as a downloading instruction on a resource corresponding to content block A or a transmitting instruction on a resource corresponding to content block B. Then, the corresponding function operating button is determined according to the instruction.

According to the web page content processing method of the foregoing embodiment, the web page content is clearly displayed according to the content block, so that the user of the electronic device can conveniently operate the resource corresponding to each content block. Moreover, the function operating button of the resource corresponding to the content blocks in the web page is further be displayed and corresponding function operations are performed on the resource corresponding to the content blocks, which effectively lowers the complexity of operations on the resource in the web page.

Figure 2:
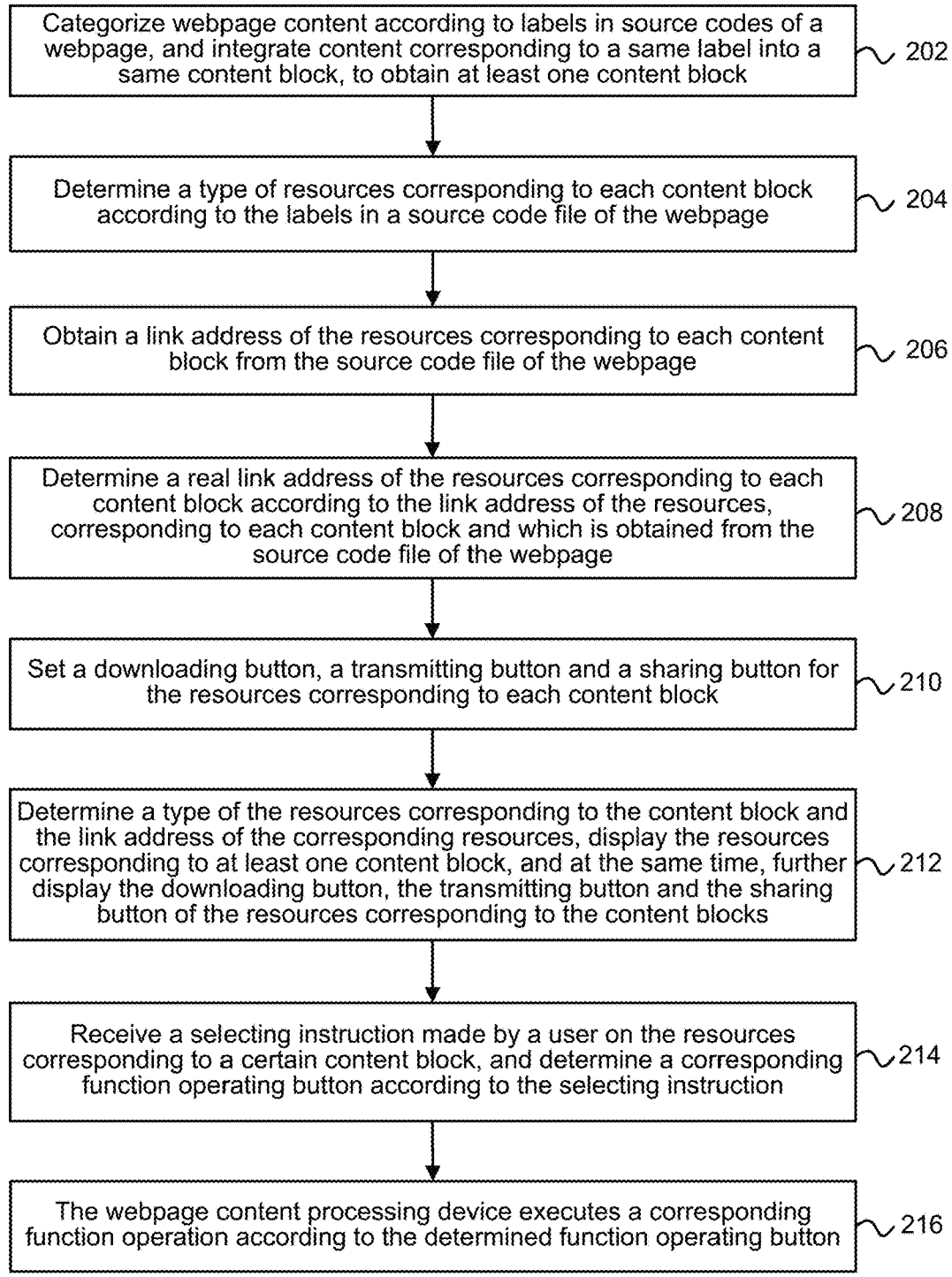
FIG. 2 is a flowchart diagram of a method of processing web page content in accordance with some embodiments.

FIG. 2 is a flowchart diagram of a method 200 of processing web page content in accordance with some embodiments. In some embodiments, the method is performed at an electronic device (e.g., mobile device 500, FIGS. 5A-5E and 8), including one or more processors and memory, or a component thereof (e.g., web page content processing module 600, FIGS. 6A-6B). Method 200 is based on and further describes the technical solution in FIG. 1. In some embodiments, the electronic device includes a touch screen display for detecting user instructions and showing results on the same display.

The electronic device categorizes (202) a web page according to labels in the source code of the web page and integrates content corresponding to a same label into a same content block, to obtain at least one content block.

The electronic device determines (204) a type of resource (or multimedia item) corresponding to each content block according to the labels in a source code file of the web page.

The electronic device obtains (206) a link address of the resources corresponding to each content block from the source code file of the web page.

The electronic device determines (208) a real link address of the resources corresponding to each content block according to the link address which is obtained from the source code file of the web page. For example, the electronic device firstly determines whether the resource corresponding to the content block is obtained from the link address of the resource corresponding to each content block. When the resource corresponding to the content block can be obtained, the link address is the real link address of the resources corresponding to the content block. Otherwise, when the resource corresponding to the content block cannot be obtained, the link address is a false link address of the resource corresponding to the content block. In this case, the false link address of the resource corresponding to the content block is sent to a daemon server, so that the daemon server can obtain the real link address of the resource corresponding to the content block according to the false link address. Then, the electronic device receives the real link address of the resources corresponding to the content block from the daemon server.

The electronic device sets (210) a downloading button, a transmitting button, and a sharing button for the resources corresponding to each content block. For a specific setting manner, reference may be made to the foregoing description.

The electronic device determines (212) a type of resource corresponding to the content block and the link address of the corresponding resource, displays the resource corresponding to at least one content block, and at the same time, further displays the downloading, the transmitting, and the sharing buttons of the resources corresponding to the content blocks.

The electronic device receives (214) a selecting instruction from a user on the resource corresponding to a certain content block and determines a corresponding function operating button according to the selecting instruction.

The electronic device executes (216) a corresponding function operation according to the determined function operating button. For example, when the determined function operating button is the downloading button, the electronic device directly downloads the content block from a website corresponding to a downloading address of the resource corresponding to the content block linked to the downloading button. In another example, when the determined function operating button is the transmitting or sharing button, the electronic device causes the resource corresponding to the content block to be transmitted to or shared with a target mobile device through the daemon server.

According to the web page content processing method of the foregoing embodiment, the web page content is clearly displayed according to the content block, so that the user of the electronic device can conveniently operate the resource corresponding to each content block. Moreover, the function operating button of the resource corresponding to the content blocks in the web page is further be displayed and corresponding function operations are performed on the resource corresponding to the content blocks, which effectively lowers the complexity of operations on the resource in the web page.

Figure 3:
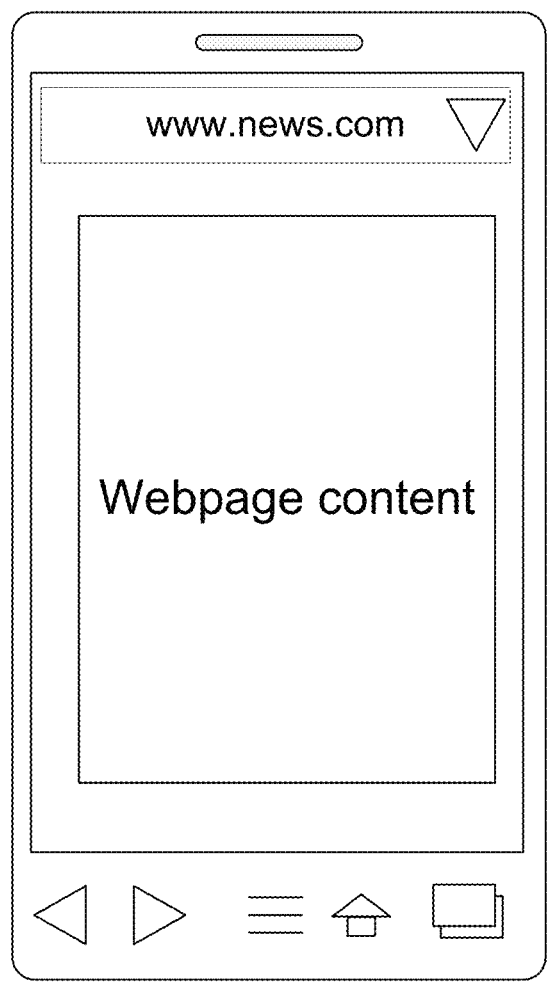
FIGS. 3-4 are user interfaces illustrating a method of processing web page content in accordance with some embodiments.
Figure 4:
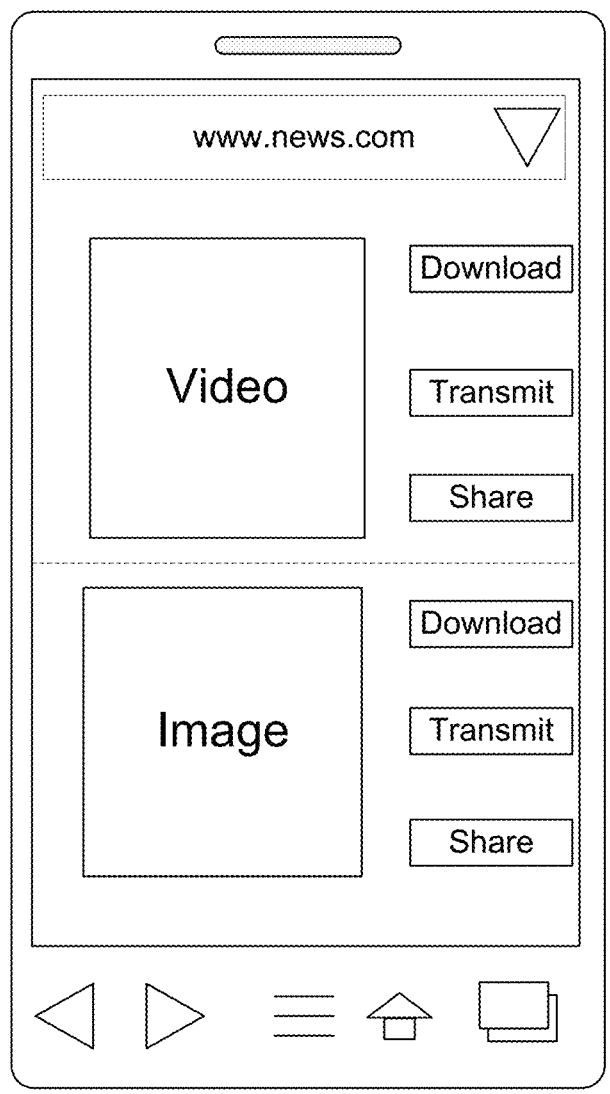

FIG. 3 is a user interface displayed by a mobile device provided in accordance with some embodiments. FIG. 4 is another user interface displayed by the mobile device in accordance with some embodiments. In FIG. 3, the mobile device displays a user interface including web page content of a certain address (e.g., a specified URL (uniform resource locator). In FIG. 3, the web page content displays all the web page content in the same web page. When a function operating button on the interface is clicked (e.g., the inverted triangle in the right side of the user interface), the web page content of the current web page is processed according to the technical solution in the embodiment of the present application (e.g., the technical solutions in FIGS. 1-2), so as to divide the web page into multiple content blocks. As shown in FIG. 4, the web page content shown in FIG. 3 is categorized into video and image content blocks. In practical application, the web page content is categorized into resources corresponding to multiple videos and multiple content blocks, and is categorized into resources corresponding to the content block of other downloadable resources.

As shown in FIGS. 3-4, the web page content is displayed according to the content block so as to conveniently operate the resources corresponding to each content block. Moreover, the function operating button of the resources corresponding to the content block in the web page is displayed, and corresponding function operations are performed on the resources corresponding to the content block, which may effectively lower the complexity of operations on the resources corresponding to the content block in the web page.

Attention is now directed towards embodiments of user interfaces and associated processes that may be implemented on a representative mobile device 500 with one or more speakers 502 enabled to output sound, one or more microphones 504 enabled to receive sound input, and a touch screen 506 (sometimes also called a touch screen display) enabled to receive one or more contacts and display information (e.g., multimedia content, web pages, and/or user interfaces for a widget or application). FIGS. 5A-5E illustrate exemplary user interfaces for processing web page content in accordance with some embodiments.

FIGS. 5A-5E show user interfaces displayed on touch screen display 506 of mobile device 500 (e.g., a mobile phone); however, one skilled in the art will appreciate that the user interfaces shown in FIGS. 5A-5E may be implemented on other similar computing devices. The embodiments described above with reference to FIGS. 1-3 provide a basis for the embodiments described below with reference to FIGS. 5A-5E. The user interfaces in FIGS. 5A-5E are used to illustrate the processes described herein, including the processes described with respect to FIGS. 1-2 and 7.

Figure 5A:
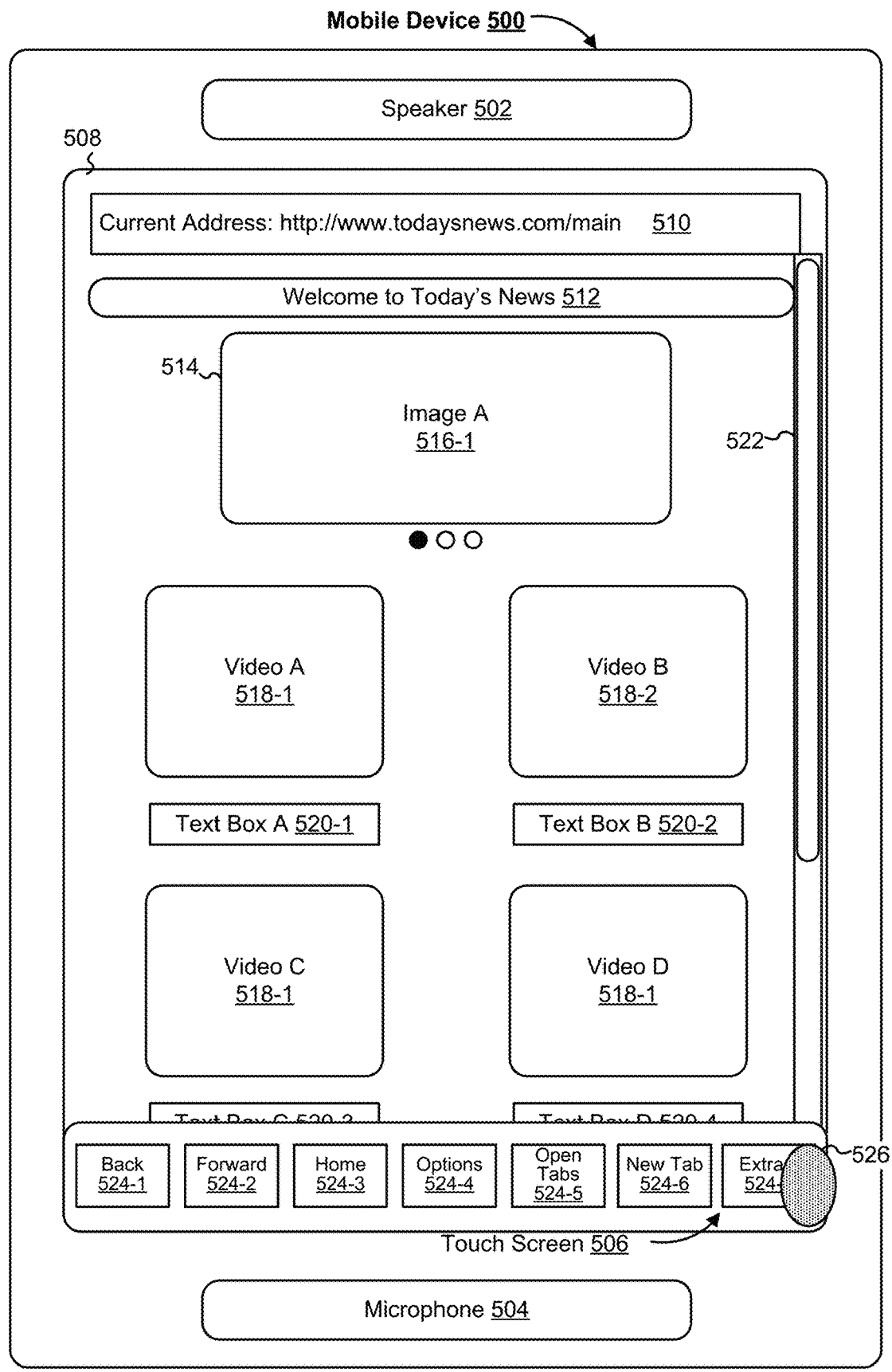
FIGS. 5A-5E are user interfaces illustrating a method of processing web page content in accordance with some embodiments.

FIG. 5A illustrates mobile device 500 displaying a user interface 508 for a web page on touch screen 506 in a web browser being executed by mobile device 500. In FIG. 5A, the web browser includes an address bar 510 indicating that the web browser is displaying a web page corresponding to a URL (e.g., http://www.todaysnews.com/main) and scroll bar 522 indicating that the user is able to scroll downwards to view the balance of the web page. In FIG. 5A, user interface 508 for the web page corresponding to the aforementioned URL includes banner 512, slideshow 514 with a plurality of images 516, and a plurality of videos 518 (e.g., video A 518-1, video B 518-2, video C 518-3, and video D 518-4) with associated text boxes 520 (e.g., text box A 520-1, text box B 520-2, text box C 520-3, and text box D 520-4). In FIG. 5A, slideshow 514 is currently displaying the first of three images (e.g., image A 516-1).

In FIG. 5A, the web browser also includes a plurality of navigation and control affordances 524 (sometimes also called user interface objects or buttons). Back affordance 524-1 when activated (e.g., by a touch input from the user), causes the web browser to display a previously viewed web page. Forward affordance 524-2 when activated (e.g., by a touch input from the user), causes the web browser to display a next web page. Home affordance 524-3 when activated (e.g., by a touch input from the user), causes the web browser to display a home web page designated by the user of mobile device 500. Options affordance 524-4 when activated (e.g., by a touch input from the user), causes the web browser to display an options panel to perform one of a plurality of operations associated with the currently displayed web page (e.g., bookmark, view source code, copy URL, etc.). Open tabs affordance 524-5 when activated (e.g., by a touch input from the user), causes the web browser to display an interface including all tabs currently open within the web browser, where the interface enables the user of mobile device 500 to navigate to another tab. New tab affordance 524-6 when activated (e.g., by a touch input from the user), causes the web browser to display a new tab (e.g., starting on the home web page designated by the user of mobile device 500). Extract affordance 524-7 when activated (e.g., by a touch input from the user), causes the web browser to analyze the source code of the web page to identify multimedia items in the web page, categorize the identified multimedia items into multimedia types, and display a user interface for the multimedia items. FIG. 5A further illustrates mobile device 500 detecting contact 526 (e.g., a tap gesture with the user's finger) (sometimes also called a user input or interaction) at a location corresponding to "Extract" affordance 524-7 on touch screen 506.

Figure 5B:
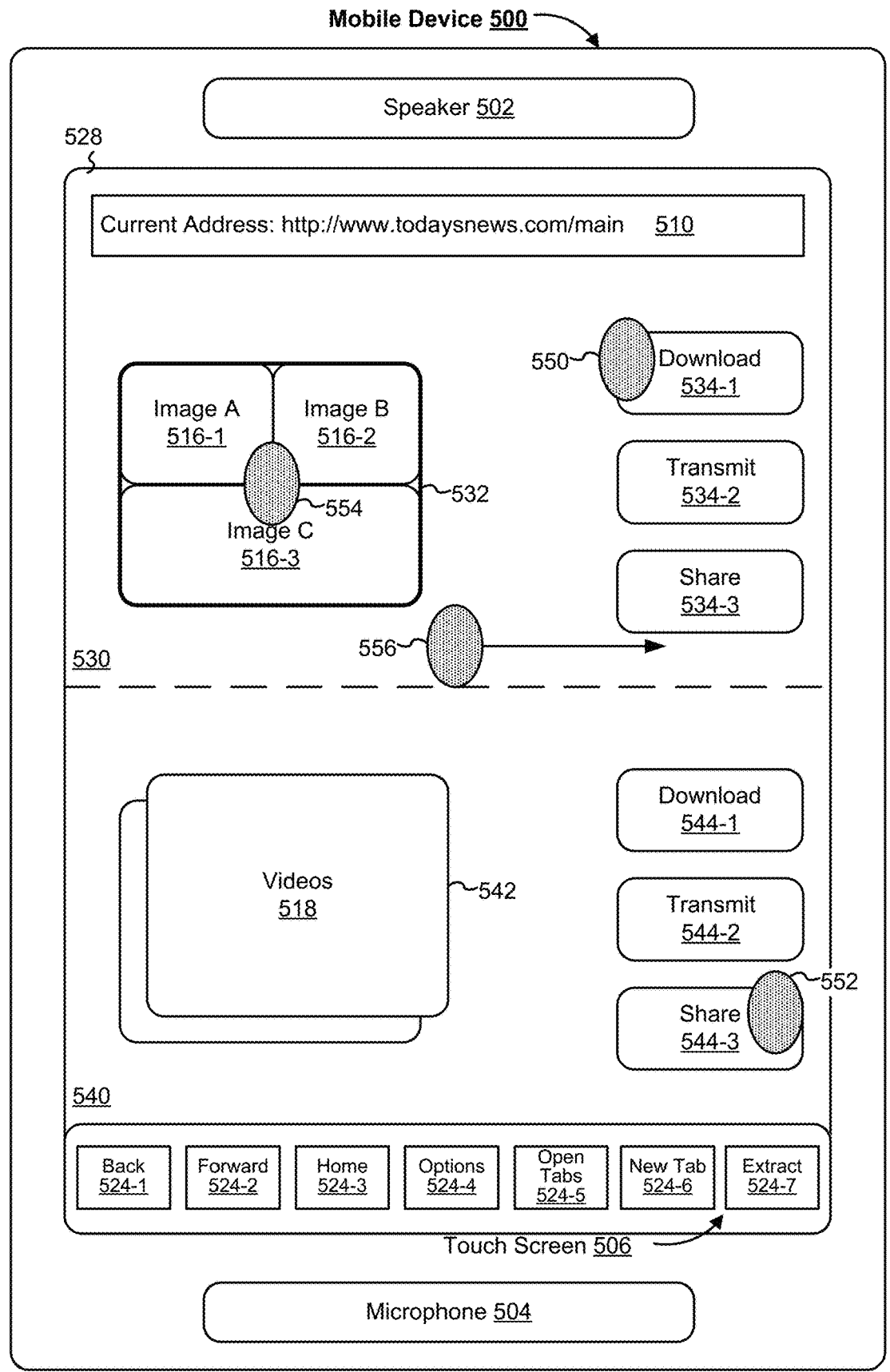

FIG. 5B illustrates mobile device 500 displaying a user interface 528 for the identified multimedia items on touch screen 506 in the web browser in response to detecting contact 526 in FIG. 5A. In FIG. 5B, user interface 528 includes first region 530 corresponding to a first type of multimedia items (e.g., images) and second region 540 corresponding to a second type of multimedia items (e.g., videos).

In FIG. 5B, first region 530 includes icon 532 corresponding to images 516 and affordances 534 for performing operations with images 516. In FIG. 5B, icon 532 shows a collage of images including image A 516-1, image B 516-2, and image C 516-3. In FIG. 5B, affordances 534 include: download affordance 534-1, which when activated (e.g., by a touch input from the user), causes mobile device 500 to download images 516 (e.g., locally to mobile device 500 and/or to remote storage); transmit affordance 534-2, which when activated (e.g., by a touch input from the user), causes mobile device 500 to transmit images 516 to a second mobile device, different from mobile device 500, associated with another user; and share affordance 534-3, which when activated (e.g., by a touch input from the user), causes mobile device 500 to share images 516 with another user via one of a plurality of social media platforms or applications.

In FIG. 5B, second region 540 includes icon 542 corresponding to videos 518 and affordances 544 for performing operations with videos 518. In FIG. 5B, icon 542 shows a stack of icons corresponding to video A 518-1, video B 518-2, video C 518-3, and video D 518-4. For example, icon 542 displays a series of video previews or stills from videos 518. In FIG. 5B, affordances 544 include: download affordance 544-1, which when activated (e.g., by a touch input from the user), causes mobile device 500 to download videos 518 (e.g., either locally to mobile device 500 or to remote storage); transmit affordance 544-2, which when activated (e.g., by a touch input from the user), causes mobile device 500 to transmit videos 518 to a second mobile device, different from mobile device 500, associated with another user; and share affordance 544-3, which when activated (e.g., by a touch input from the user), causes mobile device 500 to share videos 518 with another user via one of a plurality of social media platforms or applications.

FIG. 5B also illustrates mobile device 500 detecting contact 550 (e.g., a tap gesture with the user's finger) at a location corresponding to "Download" affordance 534-1 on touch screen 506. In response to detecting contact 550, mobile device 500 automatically downloads images 516, including image A 516-1, image B 516-2, and image C 516-3, locally to mobile device 500 and/or to remote storage. Subsequent to detecting contact 550, mobile device 500 detects contact 552 at a location corresponding to "Share" affordance 544-3 on touch screen 506. In response to detecting contact 552, mobile device 500 automatically shares videos 518, including video A 518-1, video B 518-2, video C 518-3, and video D 518-4, with another user via one of a plurality of social media platforms or applications. In one scenario, mobile device 500 detects contact 554 at a location corresponding to icon 532 on touch screen 506 (e.g., subsequent to detecting contact 552 or prior to detecting contact 550). In a second scenario, mobile device 500 detects a slide gesture with contact 556 in a substantially left-to-right horizontal direction in first region 530 (e.g., subsequent to detecting contact 552 or prior to detecting contact 550).

Figure 5C:
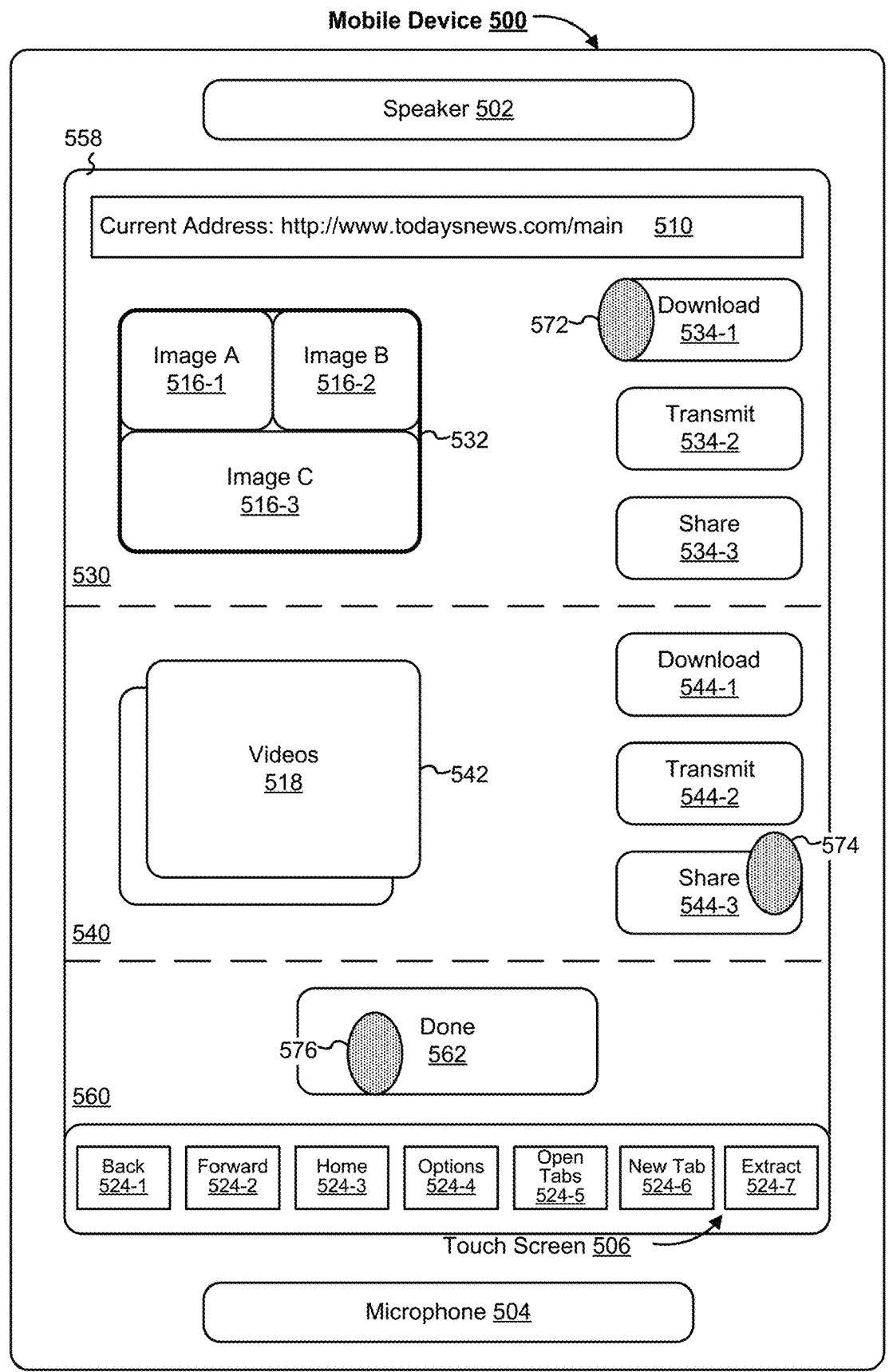

FIG. 5C illustrates mobile device 500 displaying a user interface 558 for the identified multimedia items on touch screen 506 in the web browser in response to detecting contact 526 in FIG. 5A. In FIG. 5C, user interface 528 includes first region 530 corresponding to a first type of multimedia items (e.g., images), second region 540 corresponding to a second type of multimedia items (e.g., videos), and a third region 560. In FIG. 5C, third region 560 includes done affordance 562, which when activated (e.g., by a touch input from the user), causes mobile device 500 to perform operation(s) corresponding to a selected affordance 534 and/or 544.

FIG. 5C also illustrates mobile device 500 detecting contact 572 (e.g., a tap gesture with the user's finger) at a location corresponding to "Download" affordance 534-1 on touch screen 506. In response to detecting contact 550, mobile device 500 queues the download operation of images 516, including image A 516-1, image B 516-2, and image C 516-3. Subsequent to detecting contact 572, mobile device 500 detects contact 574 at a location corresponding to "Share" affordance 544-3 on touch screen 506. In response to detecting contact 552, mobile device 500 queues the share operation of videos 518, including video A 518-1, video B 518-2, video C 518-3, and video D 518-4. Subsequent to detecting contact 574, mobile device 500 detects contact 576 at a location corresponding to "Done" affordance 562 on touch screen 506. In response to detecting contact 552, mobile device 500 performs the queued download and share operations corresponding to contacts 572 and 574, respectively.

Figure 5D:
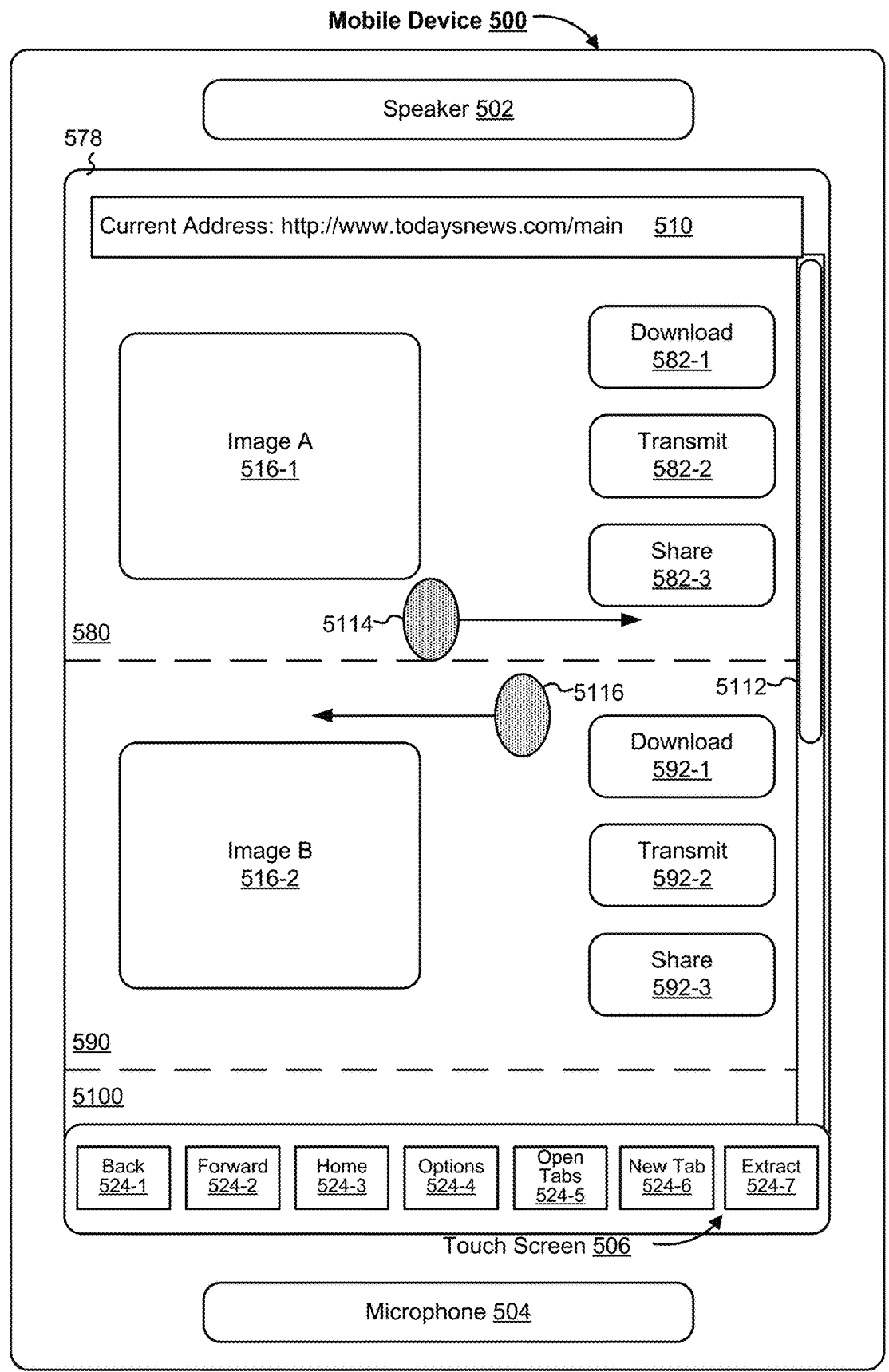

FIG. 5D illustrates mobile device 500 displaying a user interface 578 for the first multimedia item type (e.g., images) on touch screen 506 in the web browser in response to detecting contact 554 or the slide gesture with contact 556 in FIG. 5B. In FIG. 5D, user interface 578 includes first region 580 corresponding to image A 516-1, second region 590 corresponding to image B 516-2, a portion of third region 5100 corresponding to a next image (e.g., image C 516-3), and scroll bar 5112 indicating that the user is able to scroll downwards to view the balance of user interface 578 (e.g., including the remainder of third region 5100).

In FIG. 5D, first region 580 includes image A 516-1 and affordances 582 for performing operations with image A 516-1. In FIG. 5D, affordances 582 include: download affordance 582-1, which when activated (e.g., by a touch input from the user), causes mobile device 500 to download image A 516-1 (e.g., locally to mobile device 500 and/or to remote storage); transmit affordance 582-2, which when activated (e.g., by a touch input from the user), causes mobile device 500 to transmit image A 516-1 to a second mobile device, different from mobile device 500, associated with another user; and share affordance 582-3, which when activated (e.g., by a touch input from the user), causes mobile device 500 to share image A 516-1 with another user via one of a plurality of social media platforms or applications.

In FIG. 5D, second region 590 includes image B 516-2 and affordances 592 for performing operations with image B 516-2. In FIG. 5D, affordances 592 include: download affordance 592-1, which when activated (e.g., by a touch input from the user), causes mobile device 500 to download image B 516-2 (e.g., locally to mobile device 500 and/or to remote storage); transmit affordance 592-2, which when activated (e.g., by a touch input from the user), causes mobile device 500 to transmit image B 516-2 to a second mobile device, different from mobile device 500, associated with another user; and share affordance 592-3, which when activated (e.g., by a touch input from the user), causes mobile device 500 to share image B 516-2 with another user via one of a plurality of social media platforms or applications.

In one scenario, FIG. 5D further illustrates mobile device 500 detecting a slide gesture with contact 5114 in a substantially left-to-right horizontal direction in user interface 578. In a second scenario, FIG. 5D further illustrates mobile device 500 detecting a slide gesture with contact 5116 in a substantially right-to-left horizontal direction in user interface 578. For example, in response to detecting the slide gesture with contact 5116, mobile device 500 stops displaying user interface 578 and re-displays user interface 528 in FIG. 5B.

Figure 5E:
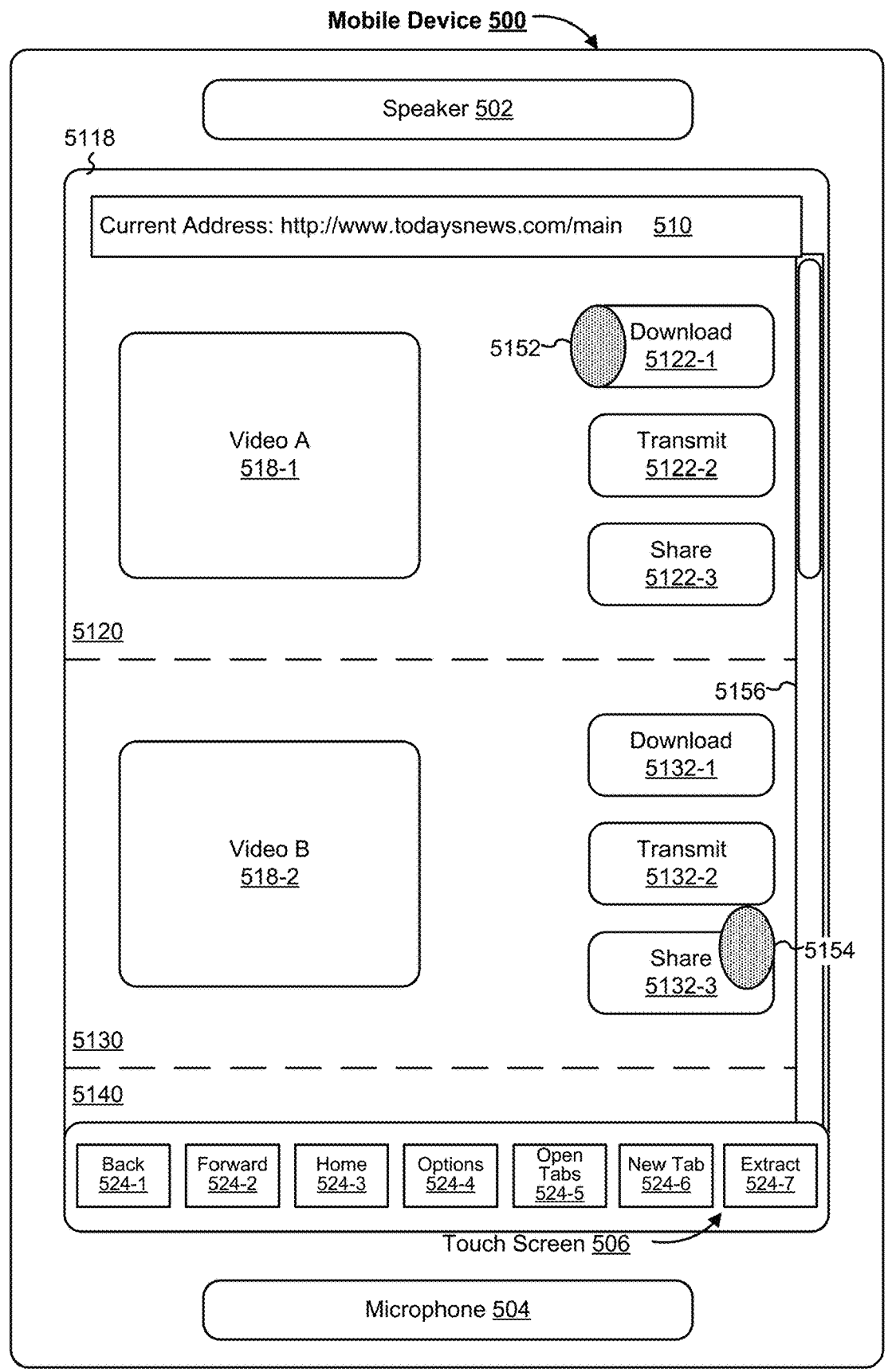

FIG. 5E illustrates mobile device 500 displaying a user interface 5118 for the second multimedia item type (e.g., videos) on touch screen 506 in the web browser in response to detecting the slide gesture with contact 5114 in FIG. 5D. In FIG. 5E, user interface 5118 includes first region 5120 corresponding to video A 518-1, second region 5130 corresponding to video B 518-2, a portion of third region 5130 corresponding to a next video (e.g., video C 518-3), and scroll bar 5156 indicating that the user is able to scroll downwards to view the balance of user interface 5118 (e.g., including the remainder of third region 5130).

In FIG. 5E, first region 5120 includes video A 518-1 and affordances 5122 for performing operations with video A 518-1. For example, video A 518-1 is playing or a series of stills from video A 518-1 are displayed. In FIG. 5E, affordances 5122 include: download affordance 5122-1, which when activated (e.g., by a touch input from the user), causes mobile device 500 to download video A 518-1 (e.g., locally to mobile device 500 and/or to remote storage); transmit affordance 5122-2, which when activated (e.g., by a touch input from the user), causes mobile device 500 to transmit video A 518-1 to a second mobile device, different from mobile device 500, associated with another user; and share affordance 5122-3, which when activated (e.g., by a touch input from the user), causes mobile device 500 to share video A 518-1 with another user via one of a plurality of social media platforms or applications.

In FIG. 5E, second region 5130 includes video B 518-2 and affordances 5132 for performing operations with video B 518-2. For example, video B 518-2 is playing or a series of stills from video B 518-2 are displayed. In FIG. 5E, affordances 5132 include: download affordance 5132-1, which when activated (e.g., by a touch input from the user), causes mobile device 500 to download video B 518-2 (e.g., locally to mobile device 500 and/or to remote storage); transmit affordance 5132-2, which when activated (e.g., by a touch input from the user), causes mobile device 500 to transmit video B 518-2 to a second mobile device, different from mobile device 500, associated with another user; and share affordance 5132-3, which when activated (e.g., by a touch input from the user), causes mobile device 500 to share video B 518-2 with another user via one of a plurality of social media platforms or applications.

FIG. 5E also illustrates mobile device 500 detecting contact 5152 (e.g., a tap gesture with the user's finger) at a location corresponding to "Download" affordance 5122-1 on touch screen 506. In response to detecting contact 5152, mobile device 500 automatically downloads video A 518-1 locally to mobile device 500 and/or to remote storage. Subsequent to detecting contact 5152, mobile device 500 detects contact 5154 at a location corresponding to "Share" affordance 5132-3 on touch screen 506. In response to detecting contact 5154, mobile device 500 automatically shares video B 518-2 with another user via one of a plurality of social media platforms or applications.

Figure 6A:
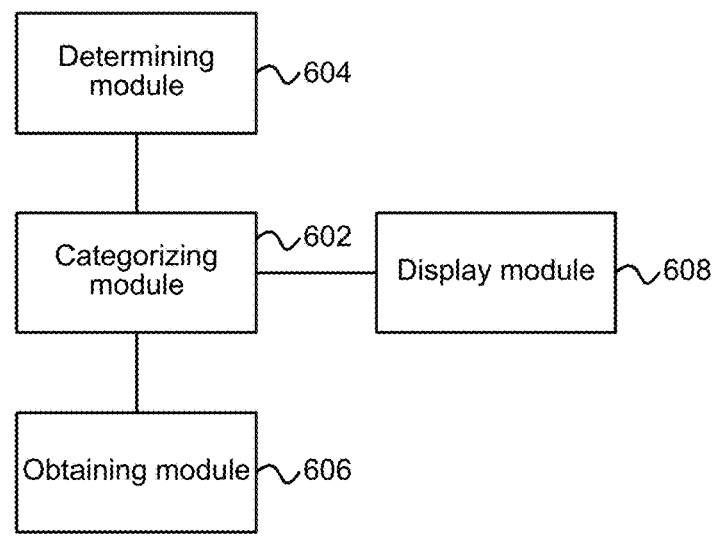
FIGS. 6A-6B are schematic block diagrams of a web page content processing module in accordance with some embodiments.

FIG. 6A is a schematic block diagram of a web page content processing module 600 in accordance with some embodiments. In some embodiments, web page content processing module 600 is a component of mobile device 500. As shown in FIG. 6A, web page content processing module 600 includes: categorizing module 602; determining module 604; obtaining module 606; and display module 608.

In some embodiments, categorizing module 602 is configured to categorize a web page according to labels in source code of the web page, and integrate content corresponding to a same label into a same content block.

In some embodiments, determining module 604 is configured to determine, according to a label in the source code of the web page, a type of resource (or multimedia item) corresponding to a content block categorized by categorizing module 602.

In some embodiments, obtaining module 606 is configured to obtain a link address of the resource corresponding to the content block categorized by categorizing module 602.

In some embodiments, display module 608 is configured to display, according to the type of resource corresponding to the content block determined by the determining module 604 and the link address of the resource corresponding to the content block obtained by the obtaining module 606, the resource corresponding to at least one content block obtained by the categorizing module 602.

In some embodiments, web page content processing module 600 performs web page content processing by adopting the foregoing modules, which is the same as an implementation mechanism of the foregoing relevant method embodiments in FIGS. 1-2. For more information, reference may be made to the descriptions of the foregoing relevant embodiments, and details are not described herein again.

According to the web page content processing module in the embodiment, with the foregoing modules, the web page content is clearly displayed according to the content block, so that the user of the electronic device can conveniently operate the resource corresponding to each content block. Moreover, the function operating button of the resource corresponding to the content blocks in the web page is further be displayed and corresponding function operations are performed on the resource corresponding to the content blocks, which effectively lowers the complexity of operations on the resource in the web page.

Figure 6B:
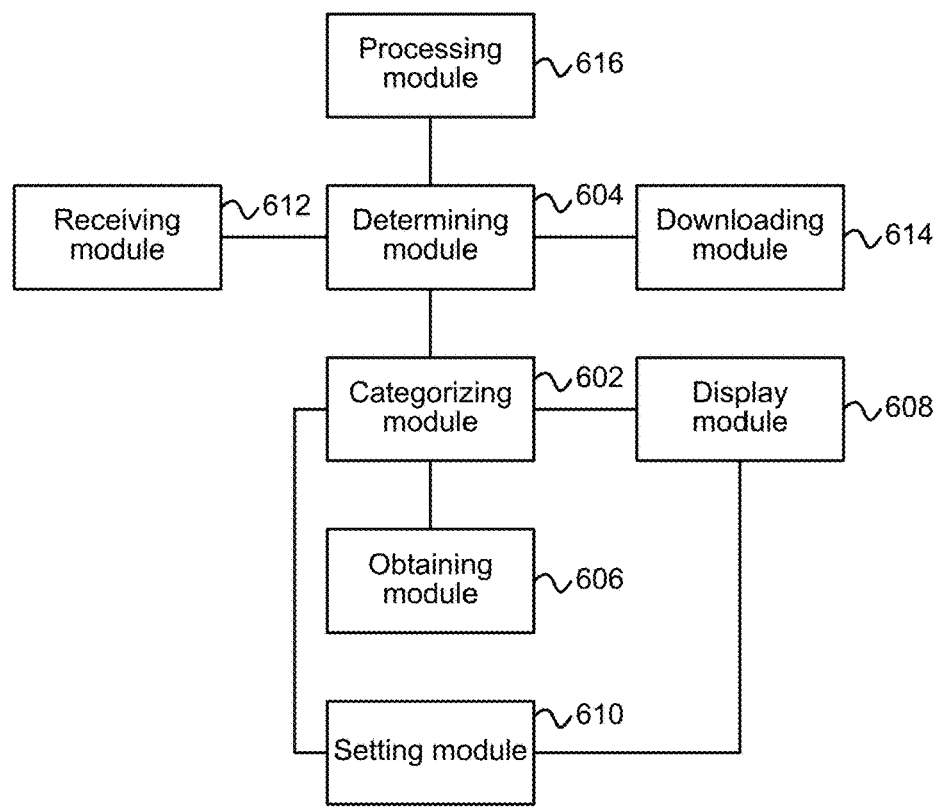

FIG. 6B is a schematic block diagram of a web page content processing module 650 in accordance with some embodiments. In some embodiments, web page content processing module 650 is a component of mobile device 500. As shown in FIG. 6B, web page content processing module 650 is based on the embodiment shown in FIG. 6A. As such, web page content processing module 650 includes: categorizing module 602; determining module 604; obtaining module 606; and display module 608. As shown in FIG. 6B, web page content processing module 650 further includes the following technical solution.

In some embodiments, obtaining module 606 is configured to obtain, from a content block categorized by categorizing module 602, a link address of resource corresponding to the content block categorized by categorizing module 602.

In some embodiments, obtaining module 606 is optionally configured to: obtain, from source code of a web page, a false link address of the resource corresponding to the content block categorized by categorizing module 602; send the false link address to a daemon server; receive the link address of the resource corresponding to the content block, where the link address of the resource corresponding to the content block is obtained by the daemon server according to the false link address.

In some embodiments, determining module 604 is optionally configured to determine the link address of the resource corresponding to the content block in the web page as the false link address before obtaining module 606 obtains, from the web page, the false link address of the resource corresponding to the content block categorized by the categorizing module 602, and when the resource corresponding to the content block cannot be obtained from the web page corresponding to the link address of the resource corresponding to the content block in the source code of the web page.

In some embodiments, as shown in FIG. 6B, web page content processing module 650 further includes: setting module 610; receiving module 612; downloading module 614; and processing module 616.

In some embodiments, setting module 610 is configured to set a function operating button of the resource corresponding to the content block categorized by the categorizing module 602. In FIG. 6B, display module 608 is further configured to display the function operating button of the resource corresponding to the content block set by setting module 610. Optionally, the function operating button in the embodiment includes at least one of a downloading button, a transmitting button, and a sharing button.

In some embodiments, receiving module 612 is configured to receive a selecting instruction made by a user on the resource corresponding to the content block. In FIG. 6B, determining module 604 is further configured to determine a corresponding function operating button according to the selecting instruction received by receiving module 612.

In some embodiments, downloading module 614 is configured to download the resource corresponding to the content block from a website corresponding to the link address of the resources corresponding to the content block when the function operating button is the downloading button, and after determining module 604 determines a corresponding function operating button as the downloading button according to the selecting instruction.

In some embodiments, processing module 616 is configured to, when the function operating button is the transmitting button or the sharing button, and after determining module 604 determines a corresponding function operating button as the transmitting button or sharing button according to the selecting instruction, cause the resource corresponding to the content block to be transmitted to or shared with a target mobile device through the daemon server.

In some embodiments, web page content processing module 650 performs web page content processing by adopting the foregoing modules, which is the same as an implementation mechanism of the foregoing relevant method embodiments in FIGS. 1-2. For more information, reference may be made to the descriptions of the foregoing relevant embodiments, and details are not described herein again.

According to the web page content processing module in the embodiment, with the foregoing modules, the web page content is clearly displayed according to the content block, so that the user of the electronic device can conveniently operate the resource corresponding to each content block. Moreover, the function operating button of the resource corresponding to the content blocks in the web page is further be displayed and corresponding function operations are performed on the resource corresponding to the content blocks, which effectively lowers the complexity of operations on the resource in the web page.

Figure 7:
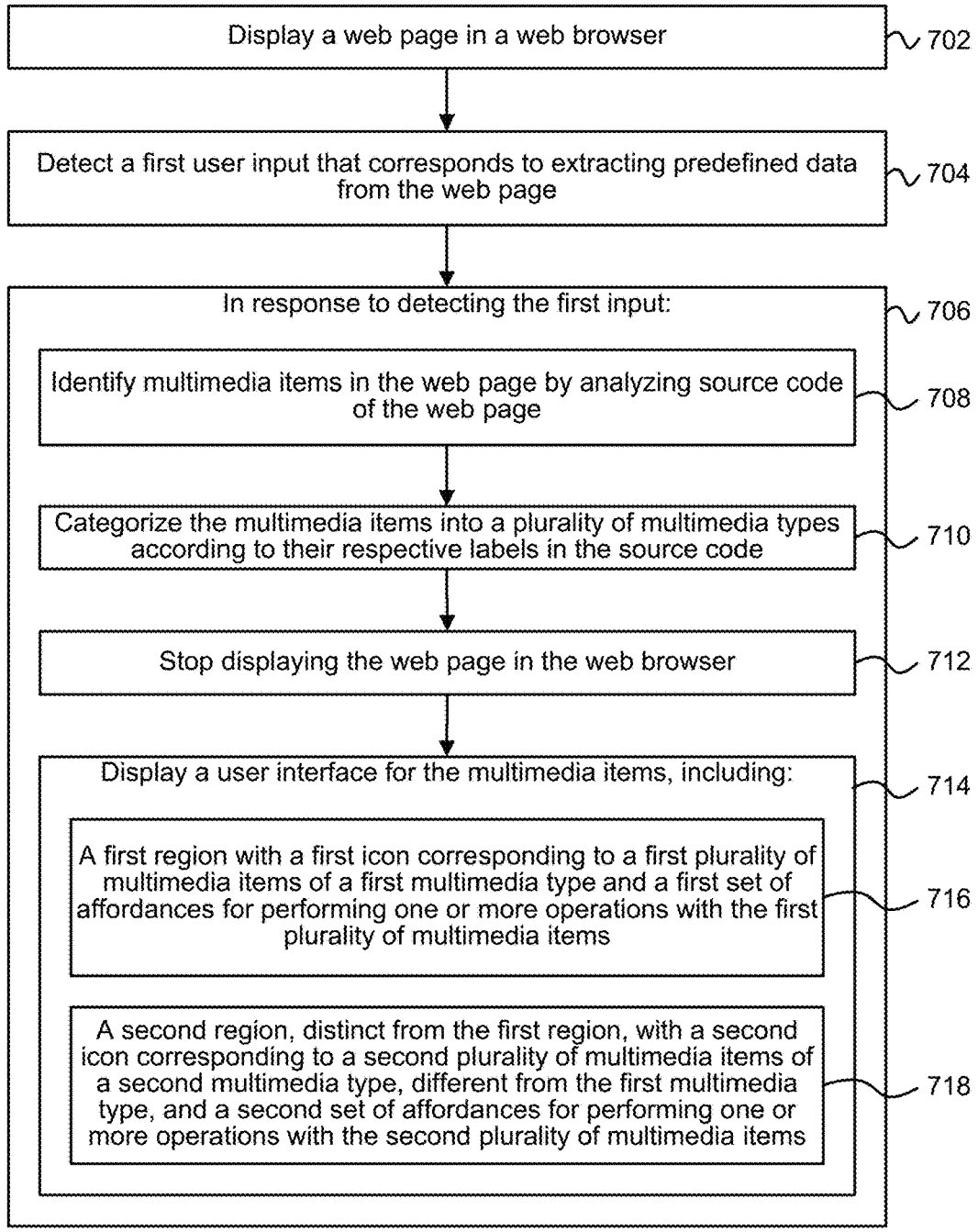
FIG. 7 is a flowchart diagram of a method of processing web page content in accordance with some embodiments.

FIG. 7 is a flowchart diagram of a method 700 of processing web page content in accordance with some embodiments. In some embodiments, the method is performed at an electronic device (e.g., mobile device 500, FIGS. 5A-5E and 8), including one or more processors and memory, or a component thereof (e.g., web page content processing module 600, FIGS. 6A-6B). Method 700 is based at least in part on the technical solutions in FIGS. 1-2. In some embodiments, the electronic device includes a touch screen display for detecting user instructions and showing results on the same display.

In some embodiments, the electronic device displays (702) a web page in a web browser. In FIG. 5A, for example, mobile device 500 displays a web page (e.g., associated with the URL: http://www.todaysnews.com/main) on touch screen 506 in a web browser being executed by mobile device 500.

In some embodiments, the electronic device detects (704) a first user input that corresponds to extracting predefined data from the web page. For example, the user selects an affordance in the web browser corresponding to a filtering function, which filters out text elements and displays only embedded multimedia items with associated operation affordances. In FIG. 5A, for example, mobile device 500 detects contact 526 at a location corresponding to "Extract" affordance 524-7 on touch screen 506.

In some embodiments, in response to detecting (706) the first input, the electronic device identifies (708) multimedia items in the web page by analyzing source code of the web page. In some embodiments, embedded multimedia items are set off by HTML tags (e.g., <video>_link_</video>). For example, in response to detecting contact 526 in FIG. 5A, mobile device 500 identifies multimedia items in the web page by analyzing the source code of the web page. With reference to FIG. 5A, for example, the identified multimedia items include: image A 516-1, image B 516-2, image C 516-3, video A 518-1, video B 518-2, video C 518-3, and video D 518-4.

In some embodiments, in response to detecting (706) the first input, the electronic device categorizes (710) the multimedia items into a plurality of multimedia types according to their respective labels in the source code. In some embodiments, the media types include: images, videos, audio, and text.

In some embodiments, in response to detecting (706) the first input, the electronic device replaces (712) the web page in the web browser with displaying (714) a user interface for the multimedia items. In FIG. 5B, for example, mobile device 500 stops displaying the web page (e.g., shown in FIG. 5A) and displays user interface 528 for the identified multimedia items on touch screen 506.

In some embodiments, user interface for the multimedia items includes (716) a first region with a first icon (e.g., a stack of media icons or a collage of corresponding multimedia items) corresponding to a first plurality of multimedia items of a first multimedia type and a first set of affordances for performing one or more operations (e.g., download, transmit, share) with the first plurality of multimedia items. In FIG. 5B, for example, user interface 528 includes first region 530 corresponding to a first type of multimedia items (e.g., images) and second region 540 corresponding to a second type of multimedia items (e.g., videos). In FIG. 5B, for example, first region 530 includes icon 532 corresponding to images 516 and affordances 534 for performing operations with images 516 (e.g., download affordance 534-1, transmit affordance 534-2, and share affordance 534-3). In FIG. 5B, for example, icon 532 shows a collage of images including image A 516-1, image B 516-2, and image C 516-3.

In some embodiments, user interface for the multimedia items also includes 518) a second region, distinct from the first region, with a second icon corresponding to a second plurality of multimedia items of a second multimedia type (e.g., images), different from the first multimedia type, and a second set of affordances for performing one or more operations with the second plurality of multimedia items. In FIG. 5B, for example, second region 540 includes icon 542 corresponding to videos 518 and affordances 544 for performing operations with videos 518 (e.g., download affordance 544-1, transmit affordance 544-2, and share affordance 544-3). In FIG. 5B, for example, icon 542 shows a stack of icons corresponding to video A 518-1, video B 518-2, video C 518-3, and video D 518-4.

In some embodiments, the first multimedia type is one of images, videos, audio, or text, and the second multimedia type is distinct from the first media type and is one of images, videos, audio, or text. In FIG. 5B, for example, the first multimedia type associated with first region 530 is images, and second multimedia type associated with second region 540 is videos.

In some embodiments, while displaying the user interface for the multimedia items, the electronic device detects a user input of selecting the first icon corresponding to the first plurality of multimedia items in the first region of the user interface for the multimedia items. In response to detecting the user input, the electronic device: and replaces the user interface for the multimedia items with displaying a user interface for the first plurality of multimedia items of the first media type. The user interface for the first plurality of multimedia items of the first media type includes: a third region with a third icon corresponding to a first media item in the first plurality of multimedia items of the first media type and a third set of affordances for performing one or more operations with the first media item in the first plurality of multimedia items; and a fourth region, distinct from the third region, with a fourth icon corresponding to a second media item in the first plurality of multimedia items of the first media type and a fourth set of affordances for performing one or more operations with the second media item in the first plurality of multimedia items. In FIG. 5B, for example, mobile device 500 detects contact 554 at a location corresponding to icon 532 in first region 530 on touch screen 506. In response to detecting contact 554, mobile device 500 replaces the user interface 528 with displaying user interface 578, in FIG. 5D, for the first multimedia item type (e.g., images) on touch screen 506. In FIG. 5D, for example, user interface 578 includes first region 580 corresponding to image A 516-1, second region 590 corresponding to image B 516-2, and a portion of third region 5100 corresponding to a next image (e.g., image C 516-3). In FIG. 5D, for example, first region 580 of user interface 578 includes image A 516-1 and affordances 582 for performing operations with image A 516-1 (e.g., download affordance 582-1, transmit affordance 582-2, and share affordance 582-3). In FIG. 5D, for example, second region 590 of user interface 578 includes image B 516-2 and affordances 592 for performing operations with image B 516-2 (e.g., download affordance 592-1, transmit affordance 592-2, and share affordance 592-3).

In some embodiments, while displaying the user interface for the multimedia items, the electronic device detects a swipe gesture in the first region of the user interface for the multimedia items in a first horizontal direction. In response to detecting the swipe gesture in the first region of the user interface for the multimedia items in the first horizontal direction, the electronic device: replaces the user interface for the multimedia items with displaying a user interface for the first plurality of multimedia items of the first media type. The user interface for the first plurality of multimedia items of the first media type includes: a third region with a third icon corresponding to a first media item in the first plurality of multimedia items of the first media type and a third set of affordances for performing one or more operations with the first media item in the first plurality of multimedia items; and a fourth region, distinct from the third region, with a fourth icon corresponding to a second media item in the first plurality of multimedia items of the first media type and a fourth set of affordances for performing one or more operations with the second media item in the first plurality of multimedia items. In FIG. 5B, for example, mobile device 500 detects a slide gesture with contact 556 in a substantially left-to-right horizontal direction in first region 530. In response to detecting the slide gesture with contact 556, mobile device 500 replaces user interface 528 with displaying user interface 578, in FIG. 5D, for the first multimedia item type (e.g., images) on touch screen 506. In FIG. 5D, for example, user interface 578 includes first region 580 corresponding to image A 516-1, second region 590 corresponding to image B 516-2, and a portion of third region 5100 corresponding to a next image (e.g., image C 516-3). In FIG. 5D, for example, first region 580 of user interface 578 includes image A 516-1 and affordances 582 for performing operations with image A 516-1 (e.g., download affordance 582-1, transmit affordance 582-2, and share affordance 582-3). In FIG. 5D, for example, second region 590 of user interface 578 includes image B 516-2 and affordances 592 for performing operations with image B 516-2 (e.g., download affordance 592-1, transmit affordance 592-2, and share affordance 592-3).

In some embodiments, while displaying the user interface for the first plurality of multimedia items of the first media type, the electronic device detects a swipe gesture in a second horizontal direction opposite to the first horizontal direction. In response to detecting the swipe gesture in the second horizontal direction, the electronic device replaces the user interface for the first plurality of multimedia items of the first media type with re-displaying the user interface for the multimedia items. In FIG. 5D, for example, mobile device detects a slide gesture with contact 5116 in a substantially right-to-left horizontal direction in user interface 578. In response to detecting the slide gesture with contact 5116, for example, mobile device 500 replaces user interface 578 with re-displaying user interface 528 in FIG. 5B.

In some embodiments, while displaying the user interface for the multimedia items, the electronic device: detects a user input of selecting one of the first set of affordances in the first region of the user interface for the multimedia items; and, in response to detecting the user input of selecting the one of the first set of affordances in the first region of the user interface for the multimedia items, automatically performs a first operation with the first plurality of multimedia items that corresponds to the selected one of the first set of affordances. In FIG. 5B, for example, mobile device 500 detects contact 550 (e.g., a tap gesture with the user's finger) at a location corresponding to "Download" affordance 534-1 on touch screen 506. In response to detecting contact 550, mobile device 500 automatically downloads images 516, including image A 516-1, image B 516-2, and image C 516-3, locally to mobile device 500 and/or to remote storage.

In some embodiments, after automatically performing the first operation, the electronic device: detects a user input of selecting one of the second set of affordances in the second region of the user interface for the multimedia items; and, in response to detecting the user input of selecting the one of the second set of affordances in the second region of the user interface for the multimedia items, automatically performs a second operation, different from the first operation, with the second plurality of multimedia items that corresponds to the selected one of the second set of affordances. In FIG. 5B, for example, subsequent to detecting contact 550, mobile device 500 detects contact 552 at a location corresponding to "Share" affordance 544-3 on touch screen 506. In response to detecting contact 552, mobile device 500 automatically shares videos 518, including video A 518-1, video B 518-2, video C 518-3, and video D 518-4, with another user via one of a plurality of social media platforms or applications.

In some embodiments, while displaying the user interface for the multimedia items, the electronic device: detects a second user input of selecting one of the first set of affordances in the first region of the user interface for the multimedia items; and detects a third user input of selecting one of the second set of affordances in the second region of the user interface for the multimedia items. In FIG. 5C, for example, mobile device 500 detects contact 572 (e.g., a tap gesture with the user's finger) at a location corresponding to "Download" affordance 534-1 in first region 530 on touch screen 506. In FIG. 5C, for example, subsequent to detecting contact 572, mobile device 500 detects contact 574 at a location corresponding to "Share" affordance 544-3 in the second region 540 on touch screen 506.

In some embodiments, the user interface for the multimedia items further includes a third region, distinct from the first and second regions, which includes an affordance (e.g., a "done" or "execute" button to perform the selected operation). While displaying the user interface for the multimedia items, the electronic device: detects a fourth user input of selecting the affordance in the third region of the user interface for the multimedia items; and in response to the fourth user input: performs a first operation with the first plurality of multimedia items that corresponds to the selected one of the first set of affordances in the first region of the user interface for the multimedia items; and performs a second operation, different from the first operation, with the second plurality of multimedia items that corresponds to the selected one of the second set of affordances in the second region of the user interface for the multimedia items. In FIG. 5C, for example, mobile device 500 displays user interface 558 including first region 530 corresponding to a first type of multimedia items (e.g., images), second region 540 corresponding to a second type of multimedia items (e.g., videos), and a third region 560 with done affordance 562. In FIG. 5C, for example, subsequent to detecting contacts 572 and 574, mobile device 500 detects contact 576 at a location corresponding to "Done" affordance 562 on touch screen 506. In response to detecting contact 552, mobile device 500 performs the download operation with images 516 and share operation with videos 518 that correspond to contacts 572 and 574, respectively.

Figure 8:
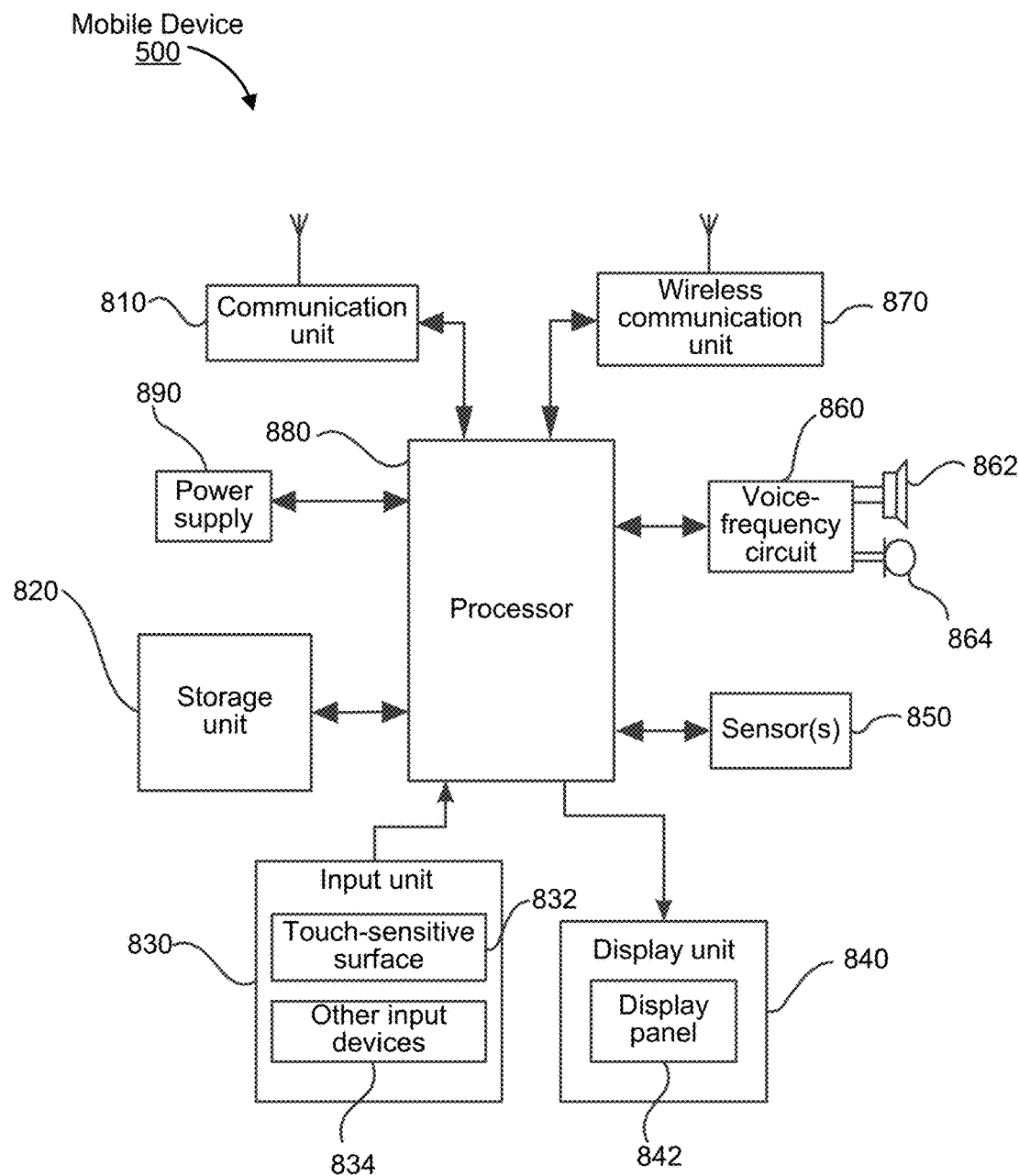
FIG. 8 is a schematic block diagram of a mobile device in accordance with some embodiments.

FIG. 8 is a schematic block diagram of a mobile device 500 in accordance with some embodiments. Referring to FIG. 8, mobile device 500 is used to implement the web page processing method provided in the foregoing embodiments.

In some embodiments, mobile device 500 includes a plurality of components, including: communication unit 810; storage unit 820 including one or more computer readable storage media; input unit 830; display unit 840; one or more sensors 850; voice-frequency circuit 860; WiFi (wireless fidelity) module 870; processor 880 including one or more processing cores; and power supply 890. Persons skilled in the prior art may understand that, the structure of mobile device 500 shown in FIG. 8 does not limit the mobile device which may include a subset or super set of the components shown in FIG. 8, or a combination of some components, or different component layouts.

In some embodiments, communication unit 810 is configured to receive and send a signal during a process of receiving or sending information or a conversation. In some embodiments, communication unit 810 is a network communication device, such as an RF (radio frequency) circuit, a router, or a modulator-demodulator. Particularly, when communication unit 810 is the RF circuit, communication unit 810 receives downlink information from a base station, and then hands over the downlink information to one or more processors 880 for processing. In addition, communication unit 810 sends related uplink data to the base station. Generally, the RF circuit in communication unit 810 includes, but is not limited to: an antenna; at least one amplifier; a tuner; one or more oscillators; a subscriber identity module (SIM) card; a transceiver; a coupler; an LNA (low noise amplifier); and a duplexer. In addition, in some embodiments, communication unit 810 further communicates with a network and other mobile devices through a wireless communication network. In some embodiments, the wireless communication network uses a communication standard or protocol, including but not limited to GSM (global system of mobile communication), GPRS (general packet radio service), CDMA (code division multiple access), WCDMA (wideband code division multiple access), LTE (long term evolution), e-mail, SMS (short messaging service), or MMS (multimedia messaging service).

In some embodiments, storage unit 820 is configured to store one or more software program or modules for execution by processor 880 to provide various functions, applications, and data processing. In some embodiments, storage unit 820 includes a program storage area and a data storage area, where the program storage area stores an operating system and one or more application programs (e.g., a voice playing function and an image playing function) needed by at least one function, and the data storage area stores data (e.g., audio data and a phone book) established according to usage of mobile device 500. In addition, storage unit 820 optionally includes high speed random access memory, and nonvolatile storage, such as at least one magnetic disk storage device, flash memory device, or other non-volatile solid-state memory devices. Accordingly, storage unit 820 optionally further includes a storage controller, so as to provide processor 880 and input unit 830 access to storage unit 820.

In some embodiments, input unit 830 is configured to receive input character information, and generate keyboard, mouse, operating arm, photology, or trackball input signals related to user inputs and function control. Specifically, input unit 830 optionally includes touch-sensitive surface 832 and other input devices 834. Touch-sensitive surface 832, also called a touch screen display, is configured to collect a touch operation on or nearby touch-sensitive surface 832 (e.g., by a user using any proper object or attachment, such as a finger and a touch pen), and drive a corresponding connection device according to a preset application. Optionally, touch-sensitive surface 832 includes a touch detecting device and a touch controller. The touch detecting device detects touch bearings of the user, detects a signal generated by a touch operation, and sends the signal to the touch controller. The touch controller receives touch information from the touch detecting device, converts the touch information into touch point coordinates, then sends the touch point coordinates to processor 880, and is capable of receiving and executing an instruction sent by processor 880. In addition, touch-sensitive surface 832 is one of a resistance, capacitance, infrared ray, or surface acoustic wave type. Input unit 830 optionally further includes other input devices 834 such as one or more of a physical keyboard, a function key (e.g., a volume control key and a switch key), a trackball, a mouse, and an operating arm.

In some embodiments, display unit 840 is configured to display information input by the user or information provided to the user and various graphical user interfaces constituted by graphics, text, icons, videos, images, or a combination thereof. In some embodiments, display unit 840 includes display panel 842 such as an LCD (liquid crystal display) or OLED (organic light-emitting diode).

Further, in some embodiments, touch-sensitive surface 832 covers display panel 842. When detecting a touch operation on or near touch-sensitive surface 832, touch-sensitive surface 832 transmits the touch operation to processor 880 to determine a type of the touch event, and then processor 880 provides relevant visual output on display panel 842 according to the type of the touch event. Although in FIG. 8, touch-sensitive surface 832 and display panel 842 implement input and output functions by serving as two independent components, in some embodiments, touch-sensitive surface 832 and display panel 842 are integrated to implement the input and output functions.

In some embodiments, mobile device 500 further includes one or more sensors 850 such as an optical sensor, a light sensor, a motion sensor, and/or other sensors. For example, the optical sensor includes an ambient light sensor and a proximity sensor, where the luminance of display panel 842 is adjusted according to the ambient light sensed by the ambient light sensor, and display panel 842 is turned off and/or a backlight is turned on when the proximity sensor determines that mobile device 500 is proximate to the user's ear. For example, the motion sensor is a gravity acceleration sensor that is enabled to detect acceleration in various directions (e.g., triaxial detection). The gravity acceleration sensor is enabled to detect a magnitude and direction of gravity acceleration, to identify an orientation of mobile device 500 (e.g., a switch between portrait and landscape mode or vice versa), and to identify relevant functions in a vibration condition (e.g., pedometer and knocking). In some embodiments, mobile device 500 further includes other sensors (e.g., as a gyroscope, a barometer, a hygrometer, a thermometer, and/or an infrared sensor) the details of which are not described herein.

In some embodiments, voice-frequency circuit 860, including one or more speakers 862 and one or more microphones 864, is configured to provide a voice-frequency interface between the user and mobile device 500. Voice-frequency circuit 860 transmits to one or more speakers 862 an electrical signal that is obtained by converting the received voice-frequency data, and one or more speakers 862 convert the electrical signal into an acoustical signal to output. In another aspect, one or more microphones 864 convert a collected acoustical signal to an electrical signal which is received and converted by the voice-frequency circuit 860 into the voice-frequency data. In some embodiments, after being output from processor 880, the voice-frequency data is sent through RF circuit 810 to another mobile device or the voice-frequency data is output to storage unit 820 for further processing. In some embodiments, voice-frequency circuit 860 further includes an ear phone jack for communication between a peripheral headset and mobile device 500.

In some embodiments, in order to implement wireless communication, mobile device 500 includes wireless communication unit 870. In some embodiments, wireless communication unit 870 is a WiFi module (e.g., for short-range wireless transmissions). In some embodiments, mobile device 500 is configured to enable the user to receive and send e-mail, browse web pages, and access streaming media through wireless communication unit 870. Although wireless communication unit 870 is included in mobile device 500 in FIG. 8, wireless communication unit 870 is not a requisite part of mobile device 500 and can be excluded without changing the scope of the present application.

In some embodiments, processor 880 is the control center of mobile device 500, which uses various interfaces and circuits to connect all the components of mobile device 500. Processor 880 also executes various functions of mobile device 500 and processes data by operating or executing software programs and/or modules stored in the storage unit 820 and/or invoking data stored in storage unit 820 so as to perform the functions of mobile device 500. Optionally, processor 880 includes one or more processor cores. In some embodiments, processor 880 preferably integrates an application processor and a modulator-demodulator processor, where the application processor is configured to process the operating system, user interface, and application programs, and the modulator-demodulator processor is configured to process wireless communications. In some embodiments, when wireless communication unit 870 is not included in mobile device 500, the foregoing modulator-demodulator processor is not integrated into processor 880.

In some embodiments, mobile device 500 further includes power supply 890 (e.g., a battery) for powering up various components. In some embodiments, power supply 890 is logically connected to processor 880 through a power supply management system so as to implement power functions such as charging, discharging, and energy consumption management. In some embodiments, power supply 890 further includes one or more direct current or alternating current power supplies, a recharging system, a power supply fault detecting circuit, a power adapter or an inverter, and a power supply status indicator.

In some embodiments, mobile device 500 further includes a camera, a Bluetooth module, and the like (not shown in FIG. 8). Specifically, in the embodiment, the display unit of the terminal device is a touch screen display.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A computer-implemented method, comprising:
   at an electronic device with one or more processors and memory:
   displaying a web page in a web browser;
   analyzing source code of the web page and identifying multimedia items in the web page according to their respective labels in the source code, each multimedia item having an associated multimedia type;
   categorizing the multimedia items into a first plurality of multimedia items of a first multimedia type and a second plurality of multimedia items of a second multimedia type different from the first multimedia type;
   replacing the web page with displaying a first user interface for the multimedia items, the first user interface including:
     a first region with a first icon that includes respective visual representations of the first plurality of multimedia items; and
     a second region, distinct from the first region, with a second icon that includes respective visual representations of the second plurality of multimedia items of a second multimedia type, different from the first multimedia type;
   detecting a user input of selecting the first icon corresponding to the first plurality of multimedia items in the first region of the first user interface for the multimedia items; and
   replacing the first user interface for the multimedia items with displaying a second user interface for the first plurality of multimedia items of the first media type, the second user interface including:
     a third region with a third icon corresponding to a first media item in the first plurality of multimedia items of the first media type and a share affordance next to the third icon that, when activated, causes the first media item to be shared with another user via a social networking application; and
     a fourth region, distinct from the third region, with a fourth icon corresponding to a second media item in the first plurality of multimedia items of the first media type and a share affordance next to the third icon that, when activated, causes the second media item to be shared with another user via the social networking application.

2. The method of claim 1, further comprising:
   before detecting the user input of selecting the first icon corresponding to the first plurality of multimedia items in the first region of the first user interface for the multimedia items:
     detecting a swipe gesture in the second region of the first user interface for the multimedia items in a first horizontal direction; and
     replacing the first user interface for the multimedia items with displaying a third user interface for the second plurality of multimedia items of the second media type, including:
       a fifth region with a fifth icon corresponding to a first media item in the second plurality of multimedia items of the second media type; and
       a sixth region, distinct from the fifth region, with a sixth icon corresponding to a second media item in the second plurality of multimedia items of the second media type.

3. The method of claim 2, further comprising:
   detecting a swipe gesture in the second region of the first user interface for the multimedia items in a second horizontal direction opposite to the first horizontal direction; and
   replacing the third user interface for the first plurality of multimedia items with re-displaying the first user interface for the multimedia items.

4. The method of claim 1, wherein the first region with the first icon further includes a first set of affordances for performing one or more operations to the first plurality of multimedia items, the method further comprising:
   detecting a second user input of selecting one of the first set of affordances in the first region of the first user interface for the multimedia items; and
   in response to detecting the second user input of selecting the one of the first set of affordances in the first region of the user interface for the multimedia items, automatically performing a first operation to the first plurality of multimedia items that corresponds to the selected one of the first set of affordances.

5. The method of claim 4, wherein the second region with the second icon further includes a second set of affordances for performing one or more operations to the second plurality of multimedia items, the method further comprising:
   detecting a user input of selecting one of the second set of affordances in the second region of the first user interface for the multimedia items; and
   in response to detecting the user input of selecting the one of the second set of affordances in the second region of the user interface for the multimedia items, automatically performing a second operation, different from the first operation, to the second plurality of multimedia items that corresponds to the selected one of the second set of affordances.

6. The method of claim 1, wherein the third region with the third icon further includes a third set of affordances for performing one or more operations to the first media item in the first plurality of multimedia items of the first media type, the method further comprising:

detecting a third user input of selecting one of the third set of affordances in the third region of the second user interface for the multimedia items; and in response to detecting the third user input of selecting the one of the third set of affordances in the third region of the second user interface for the multimedia items, automatically performing a third operation to the first media item that corresponds to the selected one of the third set of affordances.

7. An electronic device, comprising:

one or more processors; and memory storing one or more programs to be executed by the one or more processors, the one or more programs comprising instructions for:

displaying a web page in a web browser;

analyzing source code of the web page and identifying multimedia items in the web page according to their respective labels in the source code, each multimedia item having an associated multimedia type;

categorizing the multimedia items into a first plurality of multimedia items of a first multimedia type and a second plurality of multimedia items of a second multimedia type different from the first multimedia type;

replacing the web page with displaying a first user interface for the multimedia items, the first user interface including:

a first region with a first icon that includes respective visual representations of the first plurality of multimedia items; and a second region, distinct from the first region, with a second icon that includes respective visual representations of the second plurality of multimedia items of a second multimedia type, different from the first multimedia type;

detecting a user input of selecting the first icon corresponding to the first plurality of multimedia items in the first region of the first user interface for the multimedia items; and replacing the first user interface for the multimedia items with displaying a second user interface for the first plurality of multimedia items of the first media type, the second user interface including:

a third region with a third icon corresponding to a first media item in the first plurality of multimedia items of the first media type and a share affordance next to the third icon that, when activated, causes the first media item to be shared with another user via a social networking application; and a fourth region, distinct from the third region, with a fourth icon corresponding to a second media item in the first plurality of multimedia items of the first media type and a share affordance next to the third icon that, when activated, causes the second media item to be shared with another user via the social networking application.

8. The electronic device of claim 7, wherein the one or more programs further comprise instructions for:

before detecting the user input of selecting the first icon corresponding to the first plurality of multimedia items in the first region of the first user interface for the multimedia items:

detecting a swipe gesture in the second region of the first user interface for the multimedia items in a first horizontal direction; and replacing the first user interface for the multimedia items with displaying a third user interface for the second plurality of multimedia items of the second media type, including:

a fifth region with a fifth icon corresponding to a first media item in the second plurality of multimedia items of the second media type; and a sixth region, distinct from the fifth region, with a sixth icon corresponding to a second media item in the second plurality of multimedia items of the second media type.

9. The electronic device of claim 8, wherein the one or more programs further comprise instructions for:

detecting a swipe gesture in the second region of the first user interface for the multimedia items in a second horizontal direction opposite to the first horizontal direction; and replacing the third user interface for the first plurality of multimedia items with re-displaying the first user interface for the multimedia items.

10. The electronic device of claim 7, wherein the first region with the first icon further includes a first set of affordances for performing one or more operations to the first plurality of multimedia items, and the one or more programs further comprise instructions for:

detecting a second user input of selecting one of the first set of affordances in the first region of the first user interface for the multimedia items; and in response to detecting the second user input of selecting the one of the first set of affordances in the first region of the user interface for the multimedia items, automatically performing a first operation to the first plurality of multimedia items that corresponds to the selected one of the first set of affordances.

11. The electronic device of claim 10, wherein the second region with the second icon further includes a second set of affordances for performing one or more operations to the second plurality of multimedia items, and the one or more programs further comprise instructions for:

detecting a user input of selecting one of the second set of affordances in the second region of the first user interface for the multimedia items; and in response to detecting the user input of selecting the one of the second set of affordances in the second region of the user interface for the multimedia items, automatically performing a second operation, different from the first operation, to the second plurality of multimedia items that corresponds to the selected one of the second set of affordances.

12. The electronic device of claim 7, wherein the third region with the third icon further includes a third set of affordances for performing one or more operations to the first media item in the first plurality of multimedia items of the first media type, and the one or more programs further comprise instructions for:

detecting a third user input of selecting one of the third set of affordances in the third region of the second user interface for the multimedia items; and in response to detecting the third user input of selecting the one of the third set of affordances in the third region of the second user interface for the multimedia items, automatically performing a third operation to the first media item that corresponds to the selected one of the third set of affordances.

13. A non-transitory computer readable storage medium storing one or more programs, the one or more programs comprising instructions, which, when executed by an electronic device with one or more processors, cause the electronic device to perform operations comprising:

displaying a web page in a web browser;

analyzing source code of the web page and identifying multimedia items in the web page according to their respective labels in the source code, each multimedia item having an associated multimedia type;

categorizing the multimedia items into a first plurality of multimedia items of a first multimedia type and a second plurality of multimedia items of a second multimedia type different from the first multimedia type;

replacing the web page with displaying a first user interface for the multimedia items, the first user interface including:
- a first region with a first icon that includes respective visual representations of the first plurality of multimedia items; and
- a second region, distinct from the first region, with a second icon that includes respective visual representations of the second plurality of multimedia items of a second multimedia type, different from the first multimedia type;

detecting a user input of selecting the first icon corresponding to the first plurality of multimedia items in the first region of the first user interface for the multimedia items; and replacing the first user interface for the multimedia items with displaying a second user interface for the first plurality of multimedia items of the first media type, the second user interface including:
- a third region with a third icon corresponding to a first media item in the first plurality of multimedia items of the first media type and a share affordance next to the third icon that, when activated, causes the first media item to be shared with another user via a social networking application; and
- a fourth region, distinct from the third region, with a fourth icon corresponding to a second media item in the first plurality of multimedia items of the first media type and a share affordance next to the third icon that, when activated, causes the second media item to be shared with another user via the social networking application.

14. The non-transitory computer readable storage medium of claim 13, wherein the one or more programs further comprise instructions for:

before detecting the user input of selecting the first icon corresponding to the first plurality of multimedia items in the first region of the first user interface for the multimedia items:
- detecting a swipe gesture in the second region of the first user interface for the multimedia items in a first horizontal direction; and
- replacing the first user interface for the multimedia items with displaying a third user interface for the second plurality of multimedia items of the second media type, including:
  - a fifth region with a fifth icon corresponding to a first media item in the second plurality of multimedia items of the second media type; and
  - a sixth region, distinct from the fifth region, with a sixth icon corresponding to a second media item in the second plurality of multimedia items of the second media type.

15. The non-transitory computer readable storage medium of claim 14, wherein the one or more programs further comprise instructions for:
- detecting a swipe gesture in the second region of the first user interface for the multimedia items in a second horizontal direction opposite to the first horizontal direction; and
- replacing the third user interface for the first plurality of multimedia items with re-displaying the first user interface for the multimedia items.

16. The non-transitory computer readable storage medium of claim 13, wherein the first region with the first icon further includes a first set of affordances for performing one or more operations to the first plurality of multimedia items, and the one or more programs further comprise instructions for:
- detecting a second user input of selecting one of the first set of affordances in the first region of the first user interface for the multimedia items; and
- in response to detecting the second user input of selecting the one of the first set of affordances in the first region of the user interface for the multimedia items, automatically performing a first operation to the first plurality of multimedia items that corresponds to the selected one of the first set of affordances.

17. The non-transitory computer readable storage medium of claim 16, wherein the second region with the second icon further includes a second set of affordances for performing one or more operations to the second plurality of multimedia items, and the one or more programs further comprise instructions for:
- detecting a user input of selecting one of the second set of affordances in the second region of the first user interface for the multimedia items; and
- in response to detecting the user input of selecting the one of the second set of affordances in the second region of the user interface for the multimedia items, automatically performing a second operation, different from the first operation, to the second plurality of multimedia items that corresponds to the selected one of the second set of affordances.

18. The non-transitory computer readable storage medium of claim 13, wherein the third region with the third icon further includes a third set of affordances for performing one or more operations to the first media item in the first plurality of multimedia items of the first media type, and the one or more programs further comprise instructions for:
- detecting a third user input of selecting one of the third set of affordances in the third region of the second user interface for the multimedia items; and
- in response to detecting the third user input of selecting the one of the third set of affordances in the third region of the second user interface for the multimedia items, automatically performing a third operation to the first media item that corresponds to the selected one of the third set of affordances.

* * * * *